United States Patent
Rossi et al.

(10) Patent No.: US 10,235,403 B2
(45) Date of Patent: Mar. 19, 2019

(54) PARALLEL COLLECTIVE MATRIX FACTORIZATION FRAMEWORK FOR BIG DATA

(71) Applicant: Palo Alto Research Center Incorporated, Palo Alto, CA (US)

(72) Inventors: Ryan A. Rossi, West Lafayette, IN (US); Rong Zhou, San Jose, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 721 days.

(21) Appl. No.: 14/325,429

(22) Filed: Jul. 8, 2014

(65) Prior Publication Data

US 2016/0012088 A1    Jan. 14, 2016

(51) Int. Cl.
*G06F 17/30* (2006.01)
*G06Q 30/02* (2012.01)

(52) U.S. Cl.
CPC ....... *G06F 17/30324* (2013.01); *G06Q 30/02* (2013.01)

(58) Field of Classification Search
CPC .................................. G06F 17/30324
USPC ........................................ 707/736
See application file for complete search history.

(56) References Cited

PUBLICATIONS

Zhuang, A Fast Parallel SGD for Matrix Factorization in Shared Memory Systems, 2013, ACM.*
Yu, Parallel Matrix Factorization for Recommender Systems, 2013, The University of Texas at Austin.*
Richtárik, Parallel Coordinate Descent Methods for Big Data Optimization, 2013, School of Mathematics, University of Edinburgh, United Kingdom.*
Christensen, Matrix Factorization in Social Group Recommender Systems, 2013, 12th Mexican International Conference on Artificial Intelligence.*
Sarwar, Application of Dimensionality Reduction in Recommender System—A Case Study, 2000, GroupLens Research Group / Army HPC Research Center.*
Kannan, Ramakrishnan, Mariya Ishteva, and Haesun Park. "Bounded matrix factorization for recommender system." Knowledge and information systems 39.3 (2014): 491-511. (Year: 2013).*
Liu et al., "Large Graph Construction for Scalable Semi-Supervised Learning", in Proceedings of the $27^{th}$ Int'l Conf. on Machine Learning, pp. 679-686, 2010.
Massa et al., "Trust-Aware Recommender Systems", in Proceedings of the 2007 ACM Conf. on Recommender Systems, pp. 17-24, ACM, 2007.

(Continued)

*Primary Examiner* — Usmaan Saeed
*Assistant Examiner* — William P Bartlett
(74) *Attorney, Agent, or Firm* — Fay Sharpe LLP

(57) ABSTRACT

A system and a method perform matrix factorization. According to the system and the method, at least one matrix is received. The at least one matrix is to be factorized into a plurality of lower-dimension matrices defining a latent feature model. After receipt of the at least one matrix, the latent feature model is updated to approximate the at least one matrix. The latent feature model includes a plurality of latent features. Further, the update performed by cycling through the plurality of latent features at least once and alternatingly updating the plurality of lower-dimension matrices during each cycle.

12 Claims, 17 Drawing Sheets

(56) References Cited

PUBLICATIONS

Satuluri et al., "Local Graph Sparsification for Scalable Clustering", in Proceedings of the 2011 Int'l Conf. on Management of Data, pp. 721-732, ACM, Jun. 12-16, 2011.

Spielman et al., "Nearly-Linear Time Algorithms for Graph Partitioning, Graph Sparsification and Solving Linear Systems", in Proceedings of the 36$^{th}$ Annual ACM Symposium on Theory of Computing, pp. 81-90, ACM, Jun. 13-15, 2004.

Yu et al., "Scalable Coordinate Descent Approaches to Parallel Matrix Factorization for Recommender Systems", in ICDM, pp. 765-774, IEEE, 2012.

\* cited by examiner

| Symbol | Description |
| --- | --- |
| $m$ | Number of users |
| $n$ | Number of items (e.g., products, movies, music, etc.) |
| $d$ | Number of latent dimensions or model size, $1 > k > d$ |
| $\mathbf{A}$ | $m \times n$ user-by-item matrix (e.g., ratings matrix, bipartite graph, etc.) |
| $\mathbf{S}$ | $m \times m$ user-by-user matrix (e.g., a social network) |
| $\mathbf{R}$ | The residual matrix for $\mathbf{A}$, where $R_{ij} = A_{ij} - \mathbf{u}_i^T \mathbf{v}_j$ |
| $\mathbf{C}$ | The residual matrix for $\mathbf{S}$, where $C_{ij} = S_{ij} - \mathbf{u}_i^T \mathbf{z}_j$ |
| $\mathbf{U}$ | $m \times d$ latent user feature space |
| $\mathbf{V}$ | $n \times d$ latent item feature space |
| $\mathbf{Z}$ | $m \times d$ latent social network feature space |
| $\lambda$ | Regularization parameter for $\mathbf{A}$ |
| $\alpha$ | Regularization parameter for $\mathbf{S}$ (i.e., controls amount of social influence) |
| $\Omega_i$ | Set of indexes indicating the nonzero columns of row $i$ |
| $\Omega_j$ | Set of indexes indicating the nonzero rows of column $j$ |
| $[\Omega_\mathbf{A}]$ | Number of nonzeros in $\mathbf{A}$ |
| $[\Omega_\mathbf{S}]$ | Number of nonzeros in $\mathbf{S}$ |

FIG. 3

Algorithm 1 CCD$^2$++

1. Input: $A \in \mathbb{R}^{m \times n}, d, \lambda, \epsilon, T_{outer}, T_{inner}$
2. Initialize $U \in \mathbb{R}^{m \times d}$, and $V \in \mathbb{R}^{n \times d}$ uniformaly at random
3. Apply sparsification step to $U$ and $V$ (only for a few entries)
4. Set $R$ to be $A$               ▷ residual matrix $R$
5. for $\tau = 1$ to $T_{outer}$ do
6.  for $k = 1$ to $d$ do
7.   if $\tau \neq 1$ then $R_{ij} \leftarrow R_{ij} + U_{ik}^{(\tau-1)} V_{jk}^{(\tau-1)}, \forall (i,j) \in \Omega$
8.   for $t = 1$ to $T_{inner}$ do
9.    for $j = 1$ to $n$ do         ▷ fix $U$, and update $V$
10.     $q = 0, s = \lambda |\Omega_j|$
11.     for $i \in \Omega_j$ do
12.      $q \leftarrow q + R_{ij} U_{ik}^{(t)}$
13.      $s \leftarrow s + (U_{ik}^{(t)} U_{ik}^{(t)})$
14.     $V_{jk}^{(t+1)} \leftarrow q/s$
15.    for $i = 1$ to $m$ do         ▷ fix $V$, and update $U$
16.     $q = 0, s = \lambda |\Omega_i|$
17.     for $j \in \Omega_i$ do
18.      $q \leftarrow q + R_{ij} V_{jk}^{(t+1)}$
19.      $s \leftarrow s + (V_{jk}^{(t+1)} V_{jk}^{(t+1)})$
20.     $U_{ik}^{(t+1)} \leftarrow q/s$
21.   $R_{ij} \leftarrow R_{ij} - U_{ik}^{(\tau)} V_{jk}^{(\tau)}, \forall (i,j) \in \Omega$     ▷ takes $O(|\Omega_A|)$ time

*FIG. 4*

Algorithm 2 Parallel CCD$^2$

1. Initialize $U$ and $V$ uniformly at random
2. Set $R$ to be $A$
3. for $\tau = 0$ to $T_{outer}$ do
4.    for $k = 0$ to $d$ do
5.       for $t = 0$ to $T_{inner}$ do
6.          Fix $U_{*k}$ and update $V_{*k}$ in parallel
7.          Fix $V_{*k}$ and update $U_{*k}$ in parallel
8.       Update $R$ in parallel

*FIG. 5*

Algorithm 3 Collective CCD²++

1. Input: $A \in \mathbb{R}^{m \times n}$, $S \in \mathbb{R}^{m \times m}$, $d, \lambda, \epsilon, T_{outer}, T_{inner}$
2. Initialize $U \in \mathbb{R}^{m \times d}$, and $V \in \mathbb{R}^{m \times d}$ and $Z \in \mathbb{R}^{m \times d}$ uniformaly at random
3. Apply sparsification step to U, V and Z (only for a few entries)
4. Set R to be A  ▷ residual matrix R
5. Set C to be S  ▷ residual matrix C
6. for $\tau = 1$ to $T_{outer}$ do
7.   for $k = 1$ to $d$ do
8.     if $\tau \neq 1$ then
9.       $\hat{R}_{ij} = R_{ij} + U_{ik}V_{jk}, \forall (i,j) \in \Omega_A$
10.       $\hat{C}_{ij} = C_{ij} + U_{ik}Z_{jk}, \forall (i,j) \in \Omega_S$
11.     for $t = 1$ to $T_{inner}$ do
12.       for $i = 1$ to $n$ do  ▷ fix $U_{*k}$, and perform rank-1 update $V_{*k}$
13. 
$$V_{jk} \leftarrow \frac{\sum_{i \in \Omega_{A(j)}} (\hat{R}_{ij} + U_{ik}Z_{jk})U_{ik}}{\lambda + \sum_{i \in \Omega_{A(j)}} U_{ik}^2}$$

14.       for $i = 1$ to $m$ do  ▷ fix $U_{*k}$, and perform rank-1 update $Z_{*k}$
15. 
$$Z_{ik} \leftarrow \frac{\sum_{j \in \Omega_{A(j)}} (\hat{C}_{ij} + U_{ik}V_{jk})U_{ik}}{\alpha + \sum_{j \in \Omega_{S(i)}} U_{ik}^2}$$

16.       for $i = 1$ to $m$ do  ▷ fix $V_{*k}$, and perform rank-1 update $U_{*k}$
17. 
$$U_{ik} \leftarrow \frac{\sum_{j \in \Omega_{A(i)}} (\hat{R}_{ij} + U_{ik}V_{jk})V_{jk}}{\lambda + \sum_{j \in \Omega_{S(i)}} V_{jk}^2} + \frac{\sum_{j \in \Omega_{S(i)}} (\hat{C}_{ij} + U_{ik}V_{jk})Z_{jk}}{\alpha + \sum_{j \in \Omega_{S(i)}} Z_{jk}^2}$$

18.       $R_{ij} \leftarrow \hat{R}_{ij} - U_{ik}V_{jk}, \forall (i,j) \in \Omega_A$
19.       $C_{ij} \leftarrow \hat{C}_{ij} - U_{ik}Z_{jk}, \forall (i,j) \in \Omega_S$

FIG. 7

| DATASET | DESCRIPTION | $m$ | $n$ | $|\Omega_A|$ | $\bar{r}$ | $|\Omega_S|$ | $|\Omega_{test}|$ | $k$ | $\lambda$ |
|---|---|---|---|---|---|---|---|---|---|
| Dataset 1 | Users rate products | 120K | 755K | 13.6M | 4.6 | 841K | | 10 | .1 |
| Dataset 2 | Users rate movies | 71K | 65K | 9.3M | 3.5 | N/A | 698K | 40 | .1 |
| Dataset 3 | Users rate songs | 1.8K | 136K | 171M | 3.1 | N/A | | | |
| Dataset 4 | Users rate users | 135K | 168K | 17.3M | 5.9 | N/A | 867K | | |
| Dataset 5 | Users rate businesses | 229K | 11.5K | 225M | 3.7 | N/A | 4599 | 200 | .4 |
| Dataset 6 | Users rate movies | 1648 | 74K | 2.5M | 4 | N/A | 281K | | |

FIG. 8

PARALLEL COLLECTIVE MATRIX FACTORIZATION FRAMEWORK FOR BIG DATA

BACKGROUND

The present exemplary embodiments disclosed herein relate generally to matrix factorization. They find particular application in conjunction with real-time recommendation systems, and will be described with particular reference thereto. However, it is to be appreciated that the present exemplary embodiments are also amenable to other like applications.

Matrix factorization is the decomposition of a matrix into a product of matrices. Hence, matrix factorization is also known as matrix decomposition. Matrix factorization is commonly used in real-time recommendation systems, which need to be fast, scalable, and accurate. Such recommendation systems train a model to predict the preferences of users using matrix factorization.

Supposing a user-by-item matrix $a \in \mathbb{R}^{m \times n}$ (m users by n items), the matrix factorization problem for a typical recommendation systems is as follows.

$$\operatorname*{argmin}_{\substack{U \in \mathbb{R}^{m \times d} \\ V \in \mathbb{R}^{n \times d}}} \left\{ \sum_{i,j \in \Omega_A} (A_{ij} - u_i^T v_j)^2 + \lambda(\|U\|_F + \|V\|_F) \right\} \quad (1)$$

The goal of the above optimization problem is to approximate $A \approx UV^T$, where $U \in \mathbb{R}^{m \times d}$ and $V \in \mathbb{R}^{n \times d}$. This may also be interpreted as a low rank-d approximation in which a user $u_i$ and an item $v_j$ are mapped to a latent feature space $\mathbb{R}^d$ such that the interaction of the ith users with the jth product is $u_i v_j^T$.

To solve the optimization problem, a cyclic coordinate descent (CCD) based approach is typically used. A CCD based approach cyclically updates a single variable at a time while leaving the others fixed. Such approaches have two main stages: (i) using an update rule to solve each variable subproblem; and (ii) selecting the order in which the variables are updated. A commonly used CCD based approach to solving the optimization problem is the so called CCD++ approach.

In the past, recommendation systems have trained models based on only past user-item data (e.g., user i purchased an item j). However, more recently, some work has used other data in order to provide better recommendations to users.

The present application provides new and improved methods and systems for matrix factorization and real-time recommendation systems.

BRIEF DESCRIPTION

In accordance with one aspect of the present application, a system for matrix factorization is provided. The system includes at least one processor programmed to receive at least one matrix to be factorized into a plurality of lower-dimension matrices defining a latent feature model. The at least one processor is further programmed to update the latent feature model to approximate the at least one matrix, the latent feature model including a plurality of latent features. The update performed by cycling through the plurality of latent features at least once and alternatingly updating the plurality of lower-dimension matrices during each cycle.

In accordance with another aspect of the present application, a method for matrix factorization is provided. The method includes receiving at least one matrix to be factorized into a plurality of lower-dimension matrices defining a latent feature model. The method further includes updating by the at least one processor the latent feature model to approximate the at least one matrix, the latent feature model including a plurality of latent features. The updating is performed by cycling through the plurality of latent features at least once and alternatingly updating the plurality of lower-dimension matrices during each cycle.

In accordance with another aspect of the present application, a system for providing recommendations is provides. The system includes a matrix factorization module configured to update a latent feature model approximating at least one matrix. The update is performed by alternatingly updating a plurality of lower-dimension matrices defining the latent feature model. The system further includes an executor module configured to generate recommendations from the plurality of lower-dimension matrices without use of the at least one matrix. Even more, the system includes an incremental computation module configured to receive a stream of updates to the at least one matrix in real time and project a new column or row of the at least one matrix into a latent feature space of the latent feature model. The column or row is newly added to the at least one matrix by the updates. The incremental computation module is further configured to add the projection to the plurality of lower-dimension matrices.

BRIEF DESCRIPTION OF THE DRAWINGS

FIG. 3 illustrates a table of notation used to describe $CCD^2$ and Collective $CCD^2$.

FIG. 4 illustrates pseudo code for implementing $CCD^2$++.

FIG. 5 illustrates pseudo code for parallelizing $CCD^2$++.

FIG. 7 illustrates pseudo code for implementing Collective $CCD^2$++.

FIG. 8 illustrates a table of statistics regarding the datasets used for experimental analysis of $CCD^2$ and Collective $CCD^2$.

DETAILED DESCRIPTION

This present application describes an approach to matrix factorization based on cyclic coordinate descent (CCD). This approach to matrix factorization, herein referred to as CCD², is faster and more accurate than other approaches to matrix factorization based on CCD, such as CCD++. Typically, CCD² is more specifically based on CCD++, and hence more specifically referred to as CCD²++, but it can also be based on other CCD based approaches to matrix factorization.

The present application further describes a more general approach to matrix factorization for factorizing an arbitrary number of matrices and attributes using CCD², herein referred to as Collective CCD². Collective CCD² fuses two or more datasets together by representing datasets as matrices and factorizing them. For instance, given a user-by-item matrix (e.g., users purchased a product or rated a movie) and a user-by-user matrix (e.g., a social network), Collective CCD² fuses these two data sources into a single factorization.

Both CCD² and Collective CCD² find particular application in real-time recommendations systems. CCD² can be used within traditional recommendation systems in place of other CCD based approaches to matrix factorization. Traditional recommendation systems use only a user-by-item matrix for generating recommendations. Collective CCD² can be used in non-traditional recommendations making use of multiple data sources, such as user-by-item and user-by-user matrices.

Because CCD² and Collective CCD² are particularly suited for real-time recommendation systems, the following discussion focuses on such systems. The traditional recommendation system makes use of a user-by-item matrix, and the non-traditional recommendation makes use of both the user-by-item matrix and a user-by-user matrix. Despite focusing on recommendation systems, it is to be appreciated that CCD² and Collective CCD² find application anywhere CCD based approaches to matrix factorization find application. For example, CCD² and Collective CCD² can be simply employed to compress large datasets into lower dimensional approximations.

It is to be understood that the approach is flexible and can be easily adapted to factorize both matrices and tensors.

1. Preliminaries

Figures 1A, 1B:
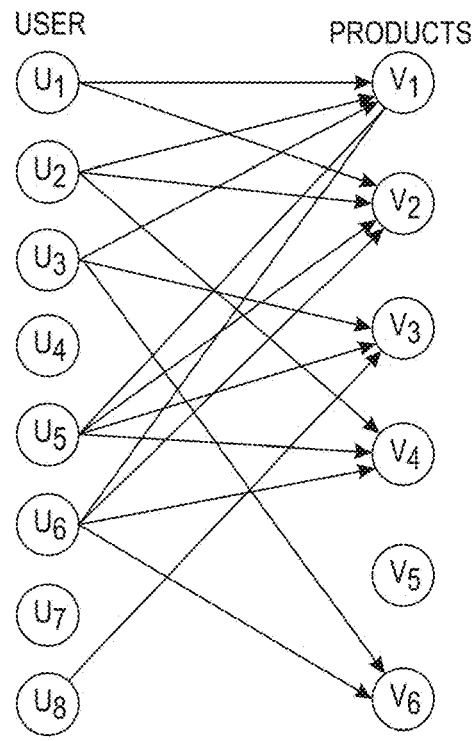
FIGS. 1A & B illustrate a user-by-item bipartite graph and a matrix representation of the graph, respectively.
Figures 2A, 2B:
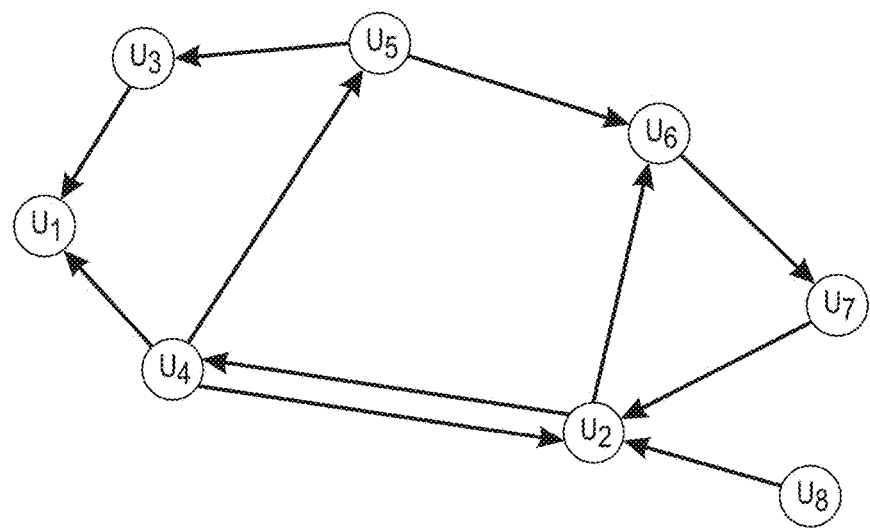
FIGS. 2A & B illustrate a user-by-user graph and a matrix representation of the graph, respectively.

Let A be a sparsely populated m×n matrix, where m represents users and n represents items, and let S be a sparsely populated m×m matrix. FIGS. 1A & B illustrate a user-by-item bipartite graph and a matrix representation of the graph, respectively. FIGS. 2A & B illustrate a user-by-user graph and a matrix representation of the graph, respectively. $\Omega_i$ and $\Omega_j$ are sets of indexes indicating the nonzero columns of row i and nonzero rows of column j, respectively, in one of A and S. Further, $|\Omega_i|$ and $|\Omega^j|$ are the number of nonzeros in row i and column j, respectively, in one of A and S.

Let $U \in \mathbb{R}^{m \times d}$, $V \in \mathbb{R}^{n \times d}$, and $Z \in \mathbb{R}^{m \times c}$ be matrices representing the lower-dimensional latent user feature space, the lower-dimensional latent item feature space, and the lower-dimensional latent social network feature space, respectively. For convenience, the ith row of U is denoted as the vector $u_i^T \in \mathbb{R}^d$ and the kth column of U is denoted as the vector $u_k \in \mathbb{R}^m$.

$$U = \begin{bmatrix} \vdots \\ u_i^T \\ \vdots \end{bmatrix} = [\ldots\ u_k\ \ldots] \quad (2)$$

Whenever more clear, the kth column of U can alternatively be denoted as $U_{*k}$. Further, the kth element of $u_i^T$ or the ith element of $u_k$ is denoted as the scalar $U_{ik}$. Similar notation is used for V and Z.

With reference to FIG. 3, a table summarizes the foregoing notation, as well as provides additional notation. Matrices are bold, uppercase roman letters. Vectors are bold, lowercase roman letters. Scalars are unbolded roman or greek letters. Indexed elements are vectors or matrices if bolded and scalars if unbolded.

The optimization to be solved by CCD² can be formulated as follows.

$$\underset{U,V}{\mathrm{argmin}}\ \mathcal{L}'(A, U, V) \quad (3)$$

$A \approx UV^T$. A common example of $\mathcal{L}'$ is as follows.

$$\mathcal{L}'(A, U, V) = \sum_{i,j \in \Omega_A} (A_{ij} - u_i^T v_j)^2 + \lambda(\|U\|_F + \|V\|_F) \quad (4)$$

The optimization to be solved by Collective CCD² can be formulated as follows.

$$\underset{U,V,Z}{\mathrm{argmin}}\ \mathcal{L}''(A, S, U, V, Z) \quad (5)$$

$A \approx UV^T$ and $S \approx UZ^T$. A common example of $\mathcal{L}''$ is as follows.

$$\mathcal{L}''(A, S, U, V, Z) = \sum_{i,j \in \Omega_A} (A_{ij} - u_i^T v_j)^2 + \sum_{i,j \in \Omega_S} (S_{ij} - u_i^T z_j)^2 + \alpha\|Z\|_F + \lambda(\|U\|_F + \|V\|_F) \quad (6)$$

Another example of $\mathcal{L}''$ is as follows.

$$\mathcal{L}''(A, S, U, V, Z) = \sum_{i,j \in \Omega_A} (A_{ij} - u_i^T v_j)^2 + \alpha \sum_{i,j \in \Omega_S} (S_{ij} - u_i^T z_j)^2 + \lambda(\|U\|_F^2 + \|V\|_F^2 + \|Z\|_F^2) \quad (7)$$

With Equation (7), user latent features $u_i$ and $u_j$ become more similar as α increase. Yet another example of $\mathcal{L}''$ is as follows.

$$\mathcal{L}''(A, S, U, V, Z) = \quad (8)$$

$$\sum_{i,j\in\Omega_A}(A_{ij}-u_i^Tv_j)^2+\alpha\sum_i\left\|u_i\sum_{w\in\Omega_{S(i)}}u_w\right\|^2+\lambda(\|U\|_F^2+\|V\|_F^2)$$

Equation (8) ensures latent feature $u_i$ of the ith user is similar to the weighted average of the latent features $u_w$ of the friends of the ith user.

Equations (4) and (6)-(8) return nonzero squared loss, since nonzero squared loss is used for recommendation systems. Assuming no regularization parameters $\lambda$ and $\alpha$, Equations (4) and (6) simplify to $\mathcal{L}'=(A_{ij}-[UV^T]_{ij})^2$ and $\mathcal{L}''=(A_{ij}-[UV^T]_{ij})^2+(S_{ij}-[UZ^T]_{ij})^2$, respectively. Alternatives to Equations (4) and (6)-(8) can also be employed.

1.1 Graph Regularization and Sparsification

Graph regularization can be used on user-by-user, user-by-items, word-document, similarity graphs, and many others. Graph sparsification is used for speeding up the $CCD^2$ and Collective $CCD^2$. Outside of CCD, it has been used for many other applications.

In some embodiments, graph regularization and sparsification is applied to Equation (4) by replacing the regularization terms with $\lambda(\Sigma_i|\neq_i|\cdot\|u_i\|^2+\Sigma_j|\Omega_j|\cdot\|v_j\|^2)$.

$$\mathcal{L}'(A,U,V)=\sum_{i,j\in\Omega_A}(A_{ij}-u_i^Tv_j)^2+\lambda\left(\sum_i|\Omega_i|\cdot\|u_i\|^2+\sum_j|\Omega_j|\cdot\|v_j\|^2\right). \quad (9)$$

Similarly, graph regularization and sparsification can be applied to Equation (6) by replacing the regularization terms with $\lambda(\Sigma_i|\Omega_i|\cdot\|u_i\|^2+\Sigma_j|\Omega_j|\cdot\|v_j\|^2)+\alpha\Sigma_i|\Omega_{S(i)}|\cdot\|z_i\|^2$.

$$\mathcal{L}''(A,S,U,V,Z)=\sum_{i,j\in\Omega_A}(A_{ij}-u_i^Tv_j)^2+\sum_{i,j\in\Omega_S}(S_{ij}-u_i^Tz_j)^2+ \quad (10)$$
$$\alpha\sum_i|\Omega_{S(i)}|\cdot\|z_i\|^2+\lambda\left(\sum_i|\Omega_i|\cdot\|u_i\|^2+\sum_j|\Omega_j|\cdot\|v_j\|^2\right)$$

As seen, each regularization term is essentially weighted by the degree (in/out).

1.2 Model Selection

The model typically varies from dataset to dataset. Further, the size of the model can be selected arbitrarily, as is typically done, in prior art systems. However, as described herein, the model parameters (e.g., model size d) are typically user selected or optimized by minimizing an objective function. The objective function L=M+E balances the model description cost M and the cost of correcting the errors of the model E. The model description cost M is typically determined using the Minimum Description Length (MDL).

To determine the optimal model size, $CCD^2$ or Collective $CCD^2$ are run on a dataset (e.g., A) for an arbitrary d. In some embodiments, this can be sped up by sampling $\mu$ rows from the dataset and using this much smaller dataset with $CCD^2$ or Collective $CCD^2$. After running $CCD^2$ or Collective $CCD^2$, the objective function is computed and used to determine whether to increase or decrease d. The foregoing then repeats until k is optimized according to the objective function or other stopping criteria are met.

Automated model selection as described is particularly important for dynamic recommendation system. Selecting d is usually difficult and non-intuitive, with the optimal value varying for each dataset. Further, since the dynamic recommendation system will adapt based on a stream of data, the optimal size of the model will also vary and require automatic online tuning. Even more, learning the model size dynamically will typically reduce overhead and increase parallel performance

1.3 Learning Ensembles $CCD^2$ or Collective CCD can be augmented in some embodiments to use multiple models. In that regard, multiple models are trained, typically simultaneously in parallel, using $CCD^2$ or Collective CCD. The trained models are then combined to get a single model representing the matrix factorization.

More specifically, p different bootstrap datasets are generated by dividing a dataset (e.g., A) into the p datasets. For example, two bootstrap datasets can be generated from even and odd numbered rows of the training dataset, respectively. A model is then trained using each of the p bootstrap datasets, and an ensemble is created by combining the models to obtain a more accurate model. Given a set P of n models, the models can be combined as follows:

$$P^*=\frac{1}{n}\sum_i P_i,$$

where P* corresponds to the combined model, and $P_i$ corresponds to the ith model. Each $P_i$ corresponds to a U and a V. In some embodiments, weights for the ensemble of models are determined such that the regularization factor can be intelligently determined and the relative importance of each individual model is automatically calibrated.

Typically, each model is trained in parallel by treating the corresponding bootstrap dataset as a job and assigning the job to some fraction of the available processors, cores, or threads. The intuition for assigning the training of a model to a fraction of the available workers (i.e., processors, cores, or threads) is the law of diminishing returns with respect to memory. Notably, a decrease in the speedup can be observed when using more than 8 workers.

2. $CCD^2$ $CCD^2$ builds on the well-known CCD approach to matrix factorization. $CDD^2$ updates all components of U and V in a cyclic fashion starting at some initial point. This initial point can be any anything. In some embodiments, initialization is performed by randomly initializing $U\in\mathbb{R}^{m\times d}$ and $V\in\mathbb{R}^{n\times d}$, and then applying a sparsification technique to U and V. The sparsification technique sets a few entries of U and V to zero. This approach to initialization was found to not only speed up convergence, but also improve accuracy of the model.

After initialization, $CCD^2$ alternatingly updates U and V for the d latent features in the following order.

$$V_{\cdot 1},U_{\cdot 1},\ldots,V_{\cdot k},U_{\cdot k},\ldots,V_{\cdot d},U_{\cdot d}$$

$V_{\cdot k}$ and $U_{\cdot k}$ are vectors of length n and m, respectively, for the kth latent feature. In contrast, traditional implementations of CCD typically order the updates to U and V as follows.

$$V_{\cdot 1},V_{\cdot 2},\ldots,V_{\cdot d},U_{\cdot 1},U_{\cdot 2},U_{\cdot d}$$

Hence, in contrast to $CCD^2$, traditional implementations of CCD completely update U before updating V.

2.1 Update Rules for a Single Element

To update a single element $U_{jk}$ in U, allow $U_{jk}$ to change with x and fix all other variables to solve the following one-variable subproblem.

$$x^* \leftarrow \underset{x}{\operatorname{argmin}} f(x) = \sum_{j \in \Omega_i} (A_{ij} - (U_{i*}V_{j*}^T - U_{ik}V_{jk}) - xV_{jk})^2 + \lambda x^2 \quad (11)$$

Observe that f(x) is a univariate quadratic function. Hence, the unique solution is as follows.

$$x^* = \frac{\sum_{j \in \Omega_i} A_{ij} - (U_{j*}V_{j*}^T + U_{ik}V_{jk})V_{jk}}{\lambda + \sum_{j \in \Omega_i} V_{jk}^2} \quad (12)$$

This computation takes $O(|\Omega_i|)$ time if the residual matrix R is maintained.

$$R_{ij} \equiv A_{ij} - U_{i*}V_{j*}^T, \forall (i,j) \in \Omega_A \quad (13)$$

Rewriting Equation (12) in terms of $R_{ij}$ yields the following.

$$x^* = \frac{\sum_{j \in \Omega_i} (R_{ij} + U_{ik}V_{jk})V_{jk}}{\lambda + \sum_{j \in \Omega_i} V_{jk}^2} \quad (14)$$

This allows $U_{ik}$ and $R_{ij}$ to be updated in $O(|\Omega_i|)$ time using the following.

$$R_{ij} \leftarrow R_{ij} - (x^* - U_{ik})V_{jk}, \forall \in \Omega_i \quad (15)$$

$$U_{ik} \leftarrow x^* \quad (16)$$

To update a single element $V_{jk}$ in V, the foregoing is similarly applied. More specifically, y* is first computed.

$$y^* = \frac{\sum_{j \in \Omega_j} (R_{ij} + U_{ik}V_{jk})U_{ik}}{\lambda + \sum_{j \in \Omega_j} U_{ik}^2} \quad (17)$$

Thereafter, $V_{jk}$ and $R_{ij}$ are updated in $O(|\Omega_j|)$ time using the following.

$$R_{ij} \leftarrow R_{ij} - (y^* - V_{jk})U_{ik}, \forall \in_j \quad (18)$$

$$V_{jk} \leftarrow y^* \quad (19)$$

Updating each $U_{ik}$ and $V_{jk}$ takes $O(|\Omega_i|)$ and $O(|\Omega_j|)$ time, respectively. This is essentially the number of nonzeros (or edges from the perspective of a graph) in the ith row and jth column, and is thus linear in the number of nonzeros.

2.2 Implementation

According to one implementation of $CCD^2$, the foregoing concepts are applied to CCD++. This implementation is termed $CCD^2$++ and described by FIG. 4, which provides pseudo code for implementing $CCD^2$++. With reference to FIG. 4, U and V are first initialized randomly with sparsification, as described above. After initialization, U and V are alternatingly updated using column-wise updates. The order in which the updates are performed impacts complexity and convergence properties. Further, column-wise updates have been found to converge faster than row-wise updates.

Factorization using a column-wise update sequence corresponds to the summation of outer-products.

$$A \approx UV^T = \sum_{k=1}^{d} U_{*k}V_{*d}^T \quad (20)$$

$U_{*k}$ and $V_{*k}$ are the kth columns (also denoted the kth latent feature) of U and V, respectively. To perform such factorization, let $T_{inner}$ and $T_{outer}$ be the number of inner and outer iterations, respectively. The number of outer iterations corresponds to the number of times the kth latent feature is updated by the $T_{inner}$ iterations, and the number of inner iterations corresponds to the number of times the kth latent feature is updated before updating the k+1 latent feature.

For each of the $T_{outer}$ iterations, the d latent features are updated in the following order.

$$V_{*1}, U_{*1}, \ldots, V_{*k}, U_{*k}, \ldots, V_{*d}, U_{*d}$$

For a τth outer iteration, each of the d latent features are updated. For a kth latent feature, $U_{*k}$ and $V_{*k}$ are updated for each of the $T_{inner}$ inner iterations. For a tth inner iteration, $U_{*k}$ and $V_{*k}$ are updated in the following order.

$$V_{1,k}, V_{2,k}, \ldots, V_{n,k}, U_{1,k}, U_{2,k}, \ldots, U_{m,k}$$

In other words, for a tth inner iteration, $U_{*k}$ is fixed and a rank-one update is performed on $V_{*k}$, and thereafter $V_{*k}$ is fixed and a rank-one update is performed on $U_{*k}$.

Note that $U_{ik}$ and $V_{jk}$ are updated in place. For instance, V and $U_{1,k}^{t+1}, \ldots, U_{i-1,k}^{t+1}, U_{i+1,k}^{t}, \ldots, U_{n,k}^{t}$ can be fixed to solve for $U_{i,k}^{t+1}$. Updating $U_{ik}$ and $V_{jk}$ in place avoids the need to copy the updated vectors back into the original matrix, which saves both the time required to do so and the space required to store the intermediate results.

To update a kth latent feature, the following is performed.

$$V_{*k} \leftarrow v^* \quad (21)$$

$$U_{*k} \leftarrow u^* \quad (22)$$

v* and u* are computed as follows.

$$\underset{\substack{u \in R^m \\ v \in R^n}}{\operatorname{argmin}} \sum_{ij \in \Omega_A} (R_{ij} + U_{ik}^{(\tau)}V_{jk}^{(\tau)} - u_i v_j)^2 + \lambda(\|u\|^2 + \|v\|^2) \quad (23)$$

To solve Equation (23), let $\hat{R}_{ij} = R_{ij} + U_{ik}^{\tau}V_{jk}^{\tau}$, $\forall (i,j) \in \Omega_A$. Through application of this to Equation (23), Equation (23) simplifies to a rank-one matrix factorization in which v is first updated, followed by u.

$$\underset{\substack{u \in R^m \\ v \in R^n}}{\operatorname{argmin}} \sum_{ij \in \Omega_A} (\hat{R}_{ij} - u_i v_j)^2 + \lambda(\|u\|^2 + \|v\|^2) \quad (24)$$

The rank-one matrix factorization is performed by the $T_{inner}$ iterations and returns both v* and u*. v* is a vector of y* values, and u* is a vector of x* values. The x* and y* values are directly obtained during the $T_{inner}$ iterations. After the $T_{inner}$ iterations complete, u* and v* are available and used to update $U_{*k}$ and $V_{*k}$ according to Equations (21) and (22). Further, R is updated as follows.

$$R_{ij} \leftarrow \hat{R}_{ij} - u_i^* v_j^* \forall (i,j) \in \Omega \quad (25)$$

$$V_{*k}^* \leftarrow v^* \quad (25a)$$

$$U_{*k}^* \leftarrow u^* \quad (25b)$$

2.2.1 Early Stopping Condition

In some embodiments, the $T_{inner}$ iterations can be terminated early and the residual matrix R can be updated. More specifically, given a small positive ratio ε (typically ε=$10^{-3}$), the inner iterations can be terminated early if the current inner-iteration reduces the localized objective function to less than ε$\Delta_{max}$. $\Delta_{max}$ is the maximum function reduction for the past inner iterations of the current outer iteration.

To determine a function reduction for an inner iteration, all the function value reductions from the single variable updates are summed.

$$\sum_i (u_i^* - u_i)^2 \cdot \left(\lambda + \sum_{j \in \Omega_{A(i)}} v_j\right) \quad (26)$$

This value represents the total objective function reduction from all users and represents a complete update of u for a single CCD iteration.

2.2.2 Column-Wise Memory Optimization

The dense matrix of U is stored in memory as a d×m matrix, and the dense matrix of V is stored in memory as a d×n matrix. Thus the latent variables of the kth feature are stored as a contiguous memory block. This memory scheme is optimized for column-wise updates where the kth latent feature of V and U are updated via $T_{inner}$ iterations before moving on to the k+1 latent feature.

2.3 Parallelization $CCD^2$ can be parallelized across p workers (i.e., processors, cores or threads) by splitting each vertex set into blocks of a fixed size b and assigning the blocks to the workers for processing in parallel. The approach to parallelizing $CCD^2$ is hereafter referred to as a block partition scheme. Since A is bipartite, there are two vertex sets to split: a user vertex set $\mathcal{U}$; and an item vertex set $\mathcal{V}$. The user vertex set $\mathcal{U}$ is split as $\{\mathcal{U}_1, \ldots, \mathcal{U}_i, \ldots, \mathcal{U}_{[m/b]}\}$, and the item vertex set $\mathcal{V}$ is split as $\{V_1, \ldots, V_j, \ldots, V_{[n/b]}\}$. Typically, the blocks are based on the initial ordering of the vertices as given by the input graph, but other orders of the vertices can be employed.

One specific approach to parallelizing $CCD^2$++ is shown by the pseudo code of FIG. 5. With reference to FIG. 5, when updating $U_{\cdot k}$ and $V_{\cdot k}$ for an inner iteration, each of the p workers are initially assigned a block of vertices from the item vertex set $\mathcal{V}$. The p workers then update the vertices for the corresponding blocks in $V_{\cdot k}$. After a worker completes its block (e.g., updating all vertices in its assigned block), it is dynamically assigned the next available block of vertices from the item vertex set $\mathcal{V}$. This dynamic scheduling provides reasonable load balancing.

Once all of the p workers complete the updating of all of the blocks of the item vertex set $\mathcal{V}$, the foregoing is repeated for the user vertex set $\mathcal{U}$ to update $U_{\cdot k}$. Alternatively, once all of the blocks of the item vertex set $\mathcal{V}$ are assigned to workers, workers proceed immediately to process the blocks of the user vertex set $\mathcal{U}$ to update $U_{\cdot k}$ regardless of whether other workers are still updating $V_{\cdot k}$. While there is a slight chance of a conflict, in practice it is hardly ever a problem. Further, even if a vertex gets an old update, then it is fixed within the next iteration.

Once all of the work for an inner iteration is assigned, the p workers complete their assigned work and wait for all of the workers to complete their assigned work for the inner iteration. The foregoing then repeats for the next inner iteration, starting with the initial assignment of blocks from the item vertex set $\mathcal{V}$ to the workers. Alternatively, once all of the work for an inner iteration is assigned, workers proceed immediately to the next iteration, which is handled as described above starting with the blocks of the item vertex set $\mathcal{V}$. In this way, workers are never waiting for work while performing the inner iterations.

After updating $U_{\cdot k}$ and $V_{\cdot k}$ and completing all of the inner iterations, R is updated in parallel. Any approach for updating R parallel can be employed, but typically each of the p workers updates those elements of R corresponding to the assigned blocks for the last iteration.

The block partition scheme generalizes to distributed architectures, multi-core shared-memory architectures, or hybrid architectures. Further, when applied to $CCD^2$++, it advantageously allows the inner-iteration to be completed asynchronously. That is to say, the rank-one updates for U and V are done asynchronously, and when there is no more work to be assigned to a worker, the worker can immediately grab more work from the next update. As an example, suppose there is no more work for a worker when updating V, then this worker can immediately grab work pertaining to updating U, while the other workers finish their final jobs when updating V.

3. Collective $CCD^2$

Collective $CCD^2$ is a general framework for collective matrix factorization based on CCD. The proposed approach fuses multiple data sources into a single factorization. This includes both edge attributes in the form of additional matrices and vertex attributes in the form of vectors. Collective $CCD^2$ uses the additional data sources to learn more accurate weights which appropriately capture the influence between data sources.

As described above, Collective $CCD^2$ is described in conjunction with the factorization of a user-by-item matrix with a user-by-user matrix. This allows the user-by-user connections to influence the user-by-item matrix. The underlying intuition is that a user's behavior is influenced by their social interactions and behavior (i.e., clickstream).

Collective $CCD^2$ builds on $CCD^2$ approach to matrix factorization. All components of U, V, and Z are updated in a cyclic fashion starting at some initial point. As above, this initial point can be set to any anything. In some embodiments, initialization is performed by randomly initializing $U \in \mathbb{R}^{m \times d}$, $V \in \mathbb{R}^{n \times d}$, and $Z \in \mathbb{R}^{m \times d}$, and then applying a sparsification technique to U, V, and Z. The sparsification technique sets a few entries of U, V, and Z to zero.

After initialization, Collective $CCD^2$ alternatingly updates U, V, and Z for the d latent features in the following order.

$$V_{\cdot k}, Z_{\cdot 1}, U_{\cdot 1}, \ldots, V_{\cdot k}, Z_{\cdot k}, U_{\cdot k}, \ldots, V_{\cdot d}, Z_{\cdot d}, U_{\cdot d}$$

Figure 6:
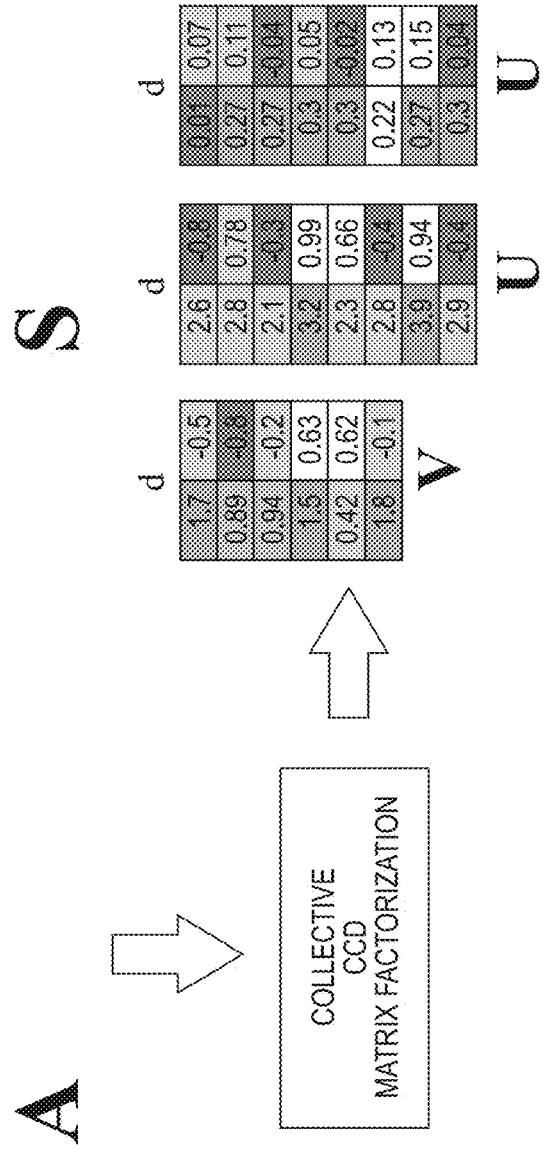
FIG. 6 illustrates a flowchart of Collective $CCD^2$++ for the matrices of FIGS. 1B and 2B.

$V_{\cdot k}$, $U_{\cdot k}$, and $Z_{\cdot k}$ are vectors of length n, m, and m, respectively, for the kth latent feature. FIG. 6 illustrates Collective $CCD^2$ for the matrices of FIGS. 1B and 2B.

3.1 Update Rules for a Single Element

To update a single element $U_{ik}$ in U, a single element $V_{jk}$ in V, and a single element $Z_{ik}$ in Z, the update rules are as follows.

$$V_{jk} \leftarrow y^* = \frac{\sum_{i \in \Omega_{A(j)}} (R_{ij} + U_{ik} V_{jk}) U_{ik}}{\lambda + \sum_{i \in \Omega_{A(j)}} U_{ik}^2} \quad (27)$$

-continued $$Z_{ik} \leftarrow z^* = \frac{\sum_{j \in \Omega_{S(i)}} (C_{ij} + U_{ik}Z_{jk})U_{ik}}{\alpha + \sum_{j \in \Omega_{S(i)}} U_{ik}^2} \quad (28)$$

$$U_{ik} \leftarrow x^* = \frac{\sum_{j \in \Omega_{A(i)}} (R_{ij} + U_{ik}V_{jk})V_{jk}}{\lambda + \sum_{j \in \Omega_{A(i)}} V_{jk}^2} + \frac{\sum_{j \in \Omega_{S(i)}} (C_{ij} + U_{ik}Z_{jk})Z_{jk}}{\alpha + \sum_{j \in \Omega_{S(i)}} Z_{jk}^2} \quad (29)$$

3.2 Implementation

According to one implementation of Collective CCD$^2$, the foregoing concepts are applied to CCD++. This implementation is termed Collective CCD$^2$++ and described by the pseudo code of FIG. 6. With reference to FIG. 7, U, V, and Z are first initialized randomly with sparsification, as described above. After initialization, U, V, and Z are alternatingly updated using column-wise updates. The order in which the updates are performed impacts complexity and convergence properties. Further, column-wise updates have been found to converge faster than row-wise updates.

Factorization using a column-wise update sequence corresponds to the summation of outer-products.

$$A \approx UV^T = \sum_{k=1}^{d} U_{\cdot k} V_{\cdot d}^T \quad (30)$$

$$S \approx UZ^T = \sum_{k=1}^{d} U_{\cdot k} Z_{\cdot d}^T \quad (31)$$

$U_{\cdot k}$, $V_{\cdot k}$, and $Z_{\cdot k}$ are the kth columns (also denoted the kth latent feature) of U, V, and Z, respectively. To perform such factorization, let $T_{inner}$ and $T_{outer}$ be the number of inner and outer iterations, respectively. The number of outer iterations corresponds to the number of times the kth latent feature is updated by the $T_{inner}$ iterations, and the number of inner iterations corresponds to the number of times the kth latent feature is updated before updating the $k_{+}1$ latent feature.

For each of the $T_{outer}$ iterations, the d latent features are updated in the following order.

$$V_{\cdot 1}, Z_{\cdot 1}, U_{\cdot 1}, \ldots, V_{\cdot k}, Z_{\cdot k}, U_{\cdot k}, \ldots, V_{\cdot d}, Z_{\cdot d}, U_{\cdot d}$$

For a τth outer iteration, each of the d latent features are updated. For a kth latent feature, $U_{\cdot k}$, $V_{\cdot k}$, and $Z_{\cdot k}$ are updated for each of the $T_{inner}$ inner iterations. For a tth inner iteration, $U_{\cdot k}$, $V_{\cdot k}$, and $Z_{\cdot k}$ are updated in the following order.

$$\underbrace{V_{1,k}, V_{2,k}, \ldots, V_{n,k}}_{v}, \underbrace{Z_{1,k}, Z_{2,k}, \ldots, Z_{m,k}}_{z}, \underbrace{U_{1,k}, U_{2,k}, \ldots, U_{m,k}}_{u}$$

In other words, for a tth inner iteration, $U_{\cdot k}$ and $Z_{\cdot k}$ are fixed and a rank-one update is performed on $V_{\cdot k}$, thereafter $V_{\cdot k}$ and $U_{\cdot k}$ are fixed and a rank-one update is performed on $Z_{\cdot k}$, and finally $V_{\cdot k}$ and $Z_{\cdot k}$ are fixed and a rank-one update is performed on $U_{\cdot k}$.

To update a kth latent feature, the following is performed.

$$V_{\cdot k} \leftarrow v^* \quad (32)$$

$$Z_{\cdot k} \leftarrow z^* \quad (33)$$

$$U_{\cdot k} \leftarrow u^* \quad (34)$$

v*, z*, and u* are obtained by the inner iterations and computed as follows.

$$\operatorname*{argmin}_{u \in \mathbb{R}^m, v \in \mathbb{R}^n, z \in \mathbb{R}^m} \left\{ \sum_{ij \in \Omega_A} (R_{ij} + U_{ik}^\tau V_{jk}^\tau - u_i v_j)^2 + \sum_{ij \in \Omega_S} (C_{ij} + U_{ik}^\tau Z_{jk}^\tau - u_i z_j)^2 + \lambda \|u\|^2 + \|v\|^2 + \|z\|^2 \right\} \quad (35)$$

To solve Equation (35), let $\hat{R}_{ij}$ and $\hat{C}_{ij}$ be defined as.

$$\hat{R}_{ij} = R_{ij} + U_{ik}V_{jk}, \forall (i,j) \in \Omega_A \quad (36)$$

$$\hat{C}_{ij} = C_{ij} + U_{ik}Z_{jk}, \forall (i,j) \in \Omega_S \quad (37)$$

Through application of Equations (36) and (37) to Equation (35), Equation (35) simplifies to a rank-one matrix factorization in which v is first updated, followed by z, and then u.

$$\operatorname*{argmin}_{u \in \mathbb{R}^m, v \in \mathbb{R}^n, z \in \mathbb{R}^m} \quad (38)$$

$$\left\{ \sum_{ij \in \Omega_A} (\hat{R}_{ij} - u_i v_j)^2 + \alpha \sum_{ij \in \Omega_S} (\hat{C}_{ij} - u_i z_j)^2 + \lambda (\|u\|^2 + \|v\|^2 + \|z\|^2) \right\}$$

The rank-one matrix factorization is performed by the $T_{inner}$ iterations and returns both v*, u*, and z*. v* is a vector of y* values, u* is a vector of x* values, and z* is a vector of z* values. The x*, y*, and z* values are directly obtained during the $T_{inner}$ iterations. After the $T_{inner}$ iterations, v*, u*, and z* are available and used to update $U_{\cdot k}$, $V_{\cdot k}$, and $Z_{\cdot k}$ according to equations (32), (33), and (34). Further, R and C are updated as follows.

$$R_{ij} \leftarrow \hat{R}_{ij} - u_i^* v_j^*, \forall (i,j) \in \Omega_A \quad (39)$$

$$C_{ij} \leftarrow \hat{C}_{ij} - u^{i*} z_j^* m \forall (i,j) \in \Omega_S \quad (40)$$

Note that in this implementation, three sparse residual matrices for V, U, and Z, respectively, are maintained.

3.2.1 Complexity Analysis

Given that $|\Omega_A|$ and $|\Omega_S|$ denote the number of nonzeros in the user-by-item matrix A and the user-by-user matrix S, respectively, Collective CCD$^2$ takes $O(d(|\Omega_A|+|\Omega_S|))$ time. If $\Phi = \max(|\Omega_A|, |\Omega_S|)$, then it takes $O(\Phi d)$ time. As previously mentioned, d is the number of latent features in the factorization. Note that $|\Omega_A|$ usually dominates $|\Omega_S|$ as it is usually more dense than the user-by-user matrix S.

To arrive at the foregoing, observe that each inner iteration that updates U, V, and Z takes $O(d(|\Omega_A|+|\Omega_S|))$, $O(d|\Omega_A|)$ time, respectively. Hence, the total computational complexity in one inner iteration is $O(d(|\Omega_A|+|\Omega_S|))$. This indicates that the runtime of Collective CCD$^2$ is linear with respect to the number of nonzeros in A and S and that Collective CCD$^2$ is efficient for billion edge graphs.

3.3 Parallelization

Collective CCD$^2$ can be parallelized across p workers (i.e., processors, cores or threads) according to the block partition scheme described above. Alternatively, the approach to Collective CCD$^2$ described in Algorithm 3 can be parallelized across p workers by splitting the $T_{inner}$ iterations into contiguous blocks of size b and dynamically assigning the blocks to the workers for processing in parallel. The parallelization scheme generalizes to distributed architectures, multi-core shared-memory architectures, or hybrid architectures.

More specifically, when updating $U_{\cdot k}$, $V_{\cdot k}$, and $Z_{\cdot k}$, each of the p workers are initially assigned a block. The p workers then update $U_{\cdot k}$, $V_{\cdot k}$, and $Z_{\cdot k}$ in parallel for their respective iterations. After a worker completes its block (e.g., completing all iterations in its assigned block), it is dynamically assigned the next available block of iterations.

Once all of the blocks are assigned, the p workers complete their assigned work and wait for all of the workers to complete their assigned work. After updating $U_{\cdot k}$, $V_{\cdot k}$, and $Z_{\cdot k}$ and completing all of the inner iterations, R and C are updated in parallel. Any approach for updating R and C in parallel can be employed, such as dividing the vertices of R and C into blocks and processing the blocks of vertices in parallel as done above for the blocks of inner iterations.

By parallelizing Collective CCD²++ as described above, memory is allocated to processors in a round-robin fashion. This advantageously helps avoid cache misses and thereby improves performance.

4. Alternatives Models

As an alternative to using the foregoing models, various other models can be employed with CCD² and Collective CCD². These alternative models can be neighborhood based or similarity based. Similarity based models blend given a similarity matrix M.

Regarding neighborhood based models, after training U and V (e.g., using CCD²), a prediction or recommendation is made using the user-by-user matrix S (e.g., a social network or an interaction/similarity matrix) with the following.

$$\hat{R}_{i*} = \theta U_{i*} V^T + (1-\theta) \sum_{(i,j): j \in \mathcal{P}_i} S_{ij} U_{i*} V_{j*} \quad (41)$$

$\mathcal{P}_i$ is the set of products that user i's friends bought. A friend is simply an edge in the user-by-user matrix (i.e., $(i,j) \in E_S$). In other embodiments, the set $\mathcal{P}_i$ can be replaced with the users in the same cluster of user i (using k-means or another approach). The θ parameter weighs the influence of the social network.

As an alternative, after training U and V, a prediction or recommendation is made using the user-by-user matrix S with the following:

$$\hat{R}_{i*} = \sum_{(i,j): j \in \mathcal{P}_i} S_{ij} U_{i*} V_{j*} \quad (42)$$

This approach has the advantage of being faster, since the computation is only over the set of products in $\mathcal{P}_i$.

5. Experimental Analysis

Experimental results describing the performance, accuracy and data sparsity of CCD² and Collective CCD² are hereafter described. Performance pertains to how well CCD² and Collective CCD² scale. Accuracy pertains to how well CCD² and Collective CCD² compare to CCD++ in terms of approximating A and S. Data Sparsity pertains to how well CCD² and Collective CCD² solve the data sparsity problem (i.e., the problem of generating recommendations for users with no or very little data).

5.1 Datasets

The datasets used for experimental analysis are described below and statistics are shown in the table of FIG. 8. Thousand is abbreviated as the numerical suffix "K", and million is abbreviated as the numerical suffix "M". For brevity, some statistics are excluded from the table.

Each of the datasets includes a user-by-item matrix being a directed bipartite graph, and Dataset1 further includes a user-by-user matrix being a directed graph. Dataset1 was used as the benchmark since both user-by-item and user-by-user matrices were available. The user-by-item matrix includes product ratings between 1 and 5, and the user-by-user matrix describes the level of trust users have for one another by 1 or −1 for friend or foe, respectively. In contrast with many of the other datasets, Dataset1 is sparsely populated. Dataset3 represents a community's preferences for various songs. Dataset3 includes 717 million ratings of 136 thousand songs given by 1.8 million users. Dataset5 contains reviews for a metropolitan area where users have rated businesses from 1 to 10.

During analysis, each of the datasets was split into training and testing datasets. Further, whenever possible, cross-validation was employed with the splits for reproducibility. For Dataset3, the training and testing datasets were also combined and used to test scalability. Unless otherwise specified, only the bipartite user-by-item graph was used. Moreover, in all experiments, $\lambda=0.1$, $\alpha=1$, and $T_{outer}=T_{inner}=5$, unless otherwise noted After splitting the datasets, CCD² and Collective CCD² were applied to the training datasets, as described above. The trained model (i.e., U and V for CCD², and U, V and Z for Collective CCD²) was then evaluated using the testing datasets. That is to say, the trained model was used to make predictions and compared to the known results.

Figure 9A:
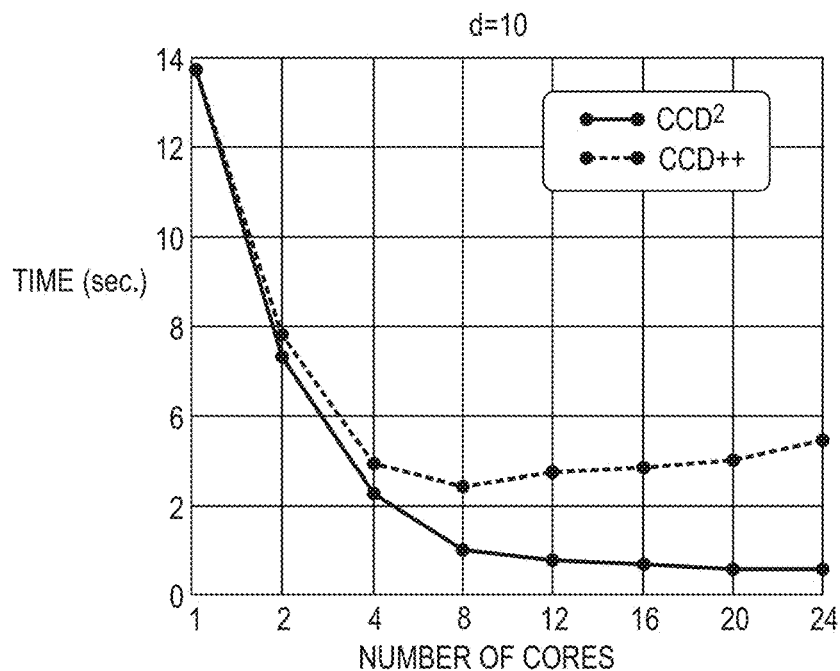
FIGS. 9A-C illustrates plots of the run time for both $CCD^2$ and CCD++ as a function of the number of processing cores for the training dataset of Dataset2 and for latent feature spaces of size 10, 20 and 40, respectively.
Figure 9B:
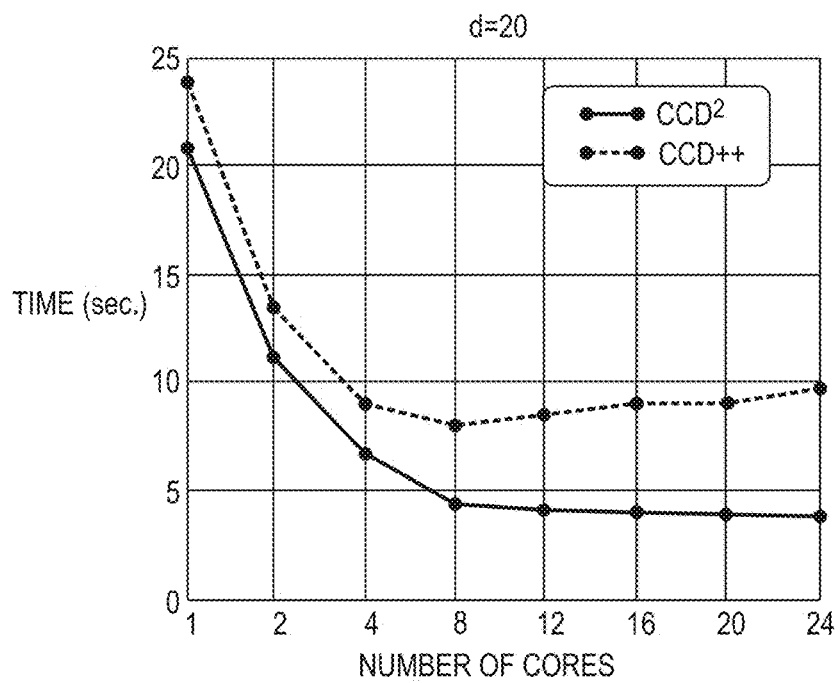
Figure 9C:
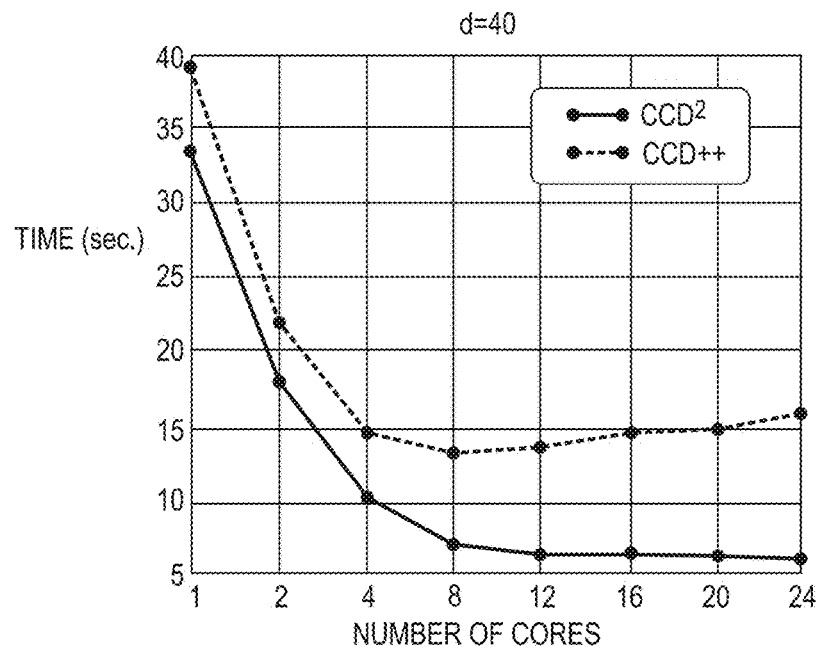
Figure 10A:
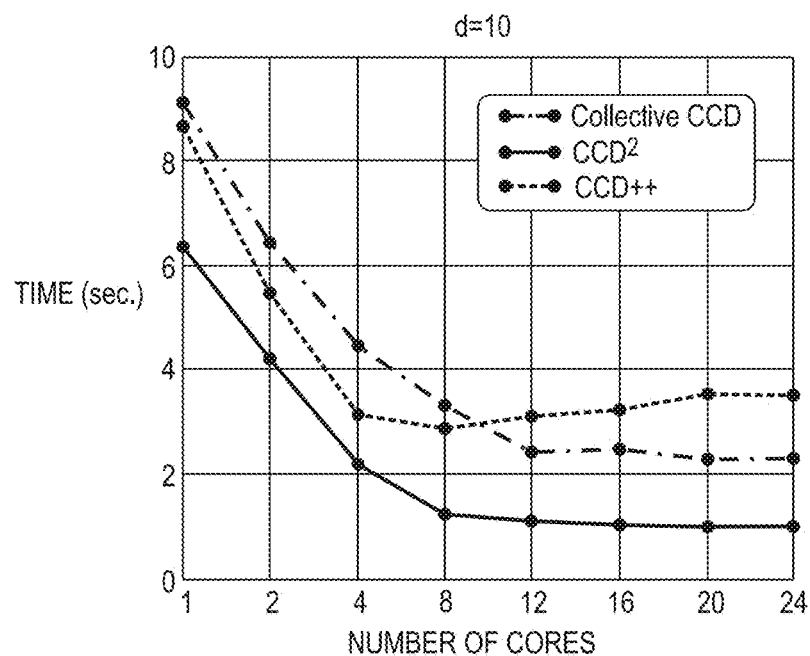
FIGS. 10A-C illustrate plots of the run time for $CCD^2$, Collective $CCD^2$ and CCD++ as a function of the number of processing cores for the training dataset of Dataset1 and for latent feature spaces of size 10, 20 and 40, respectively.
Figure 10B:
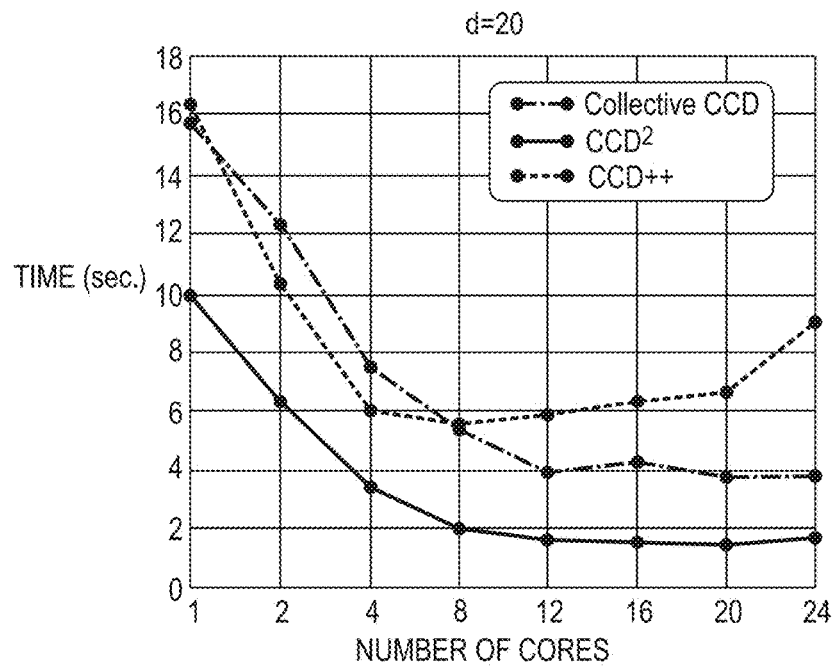
Figure 10C:
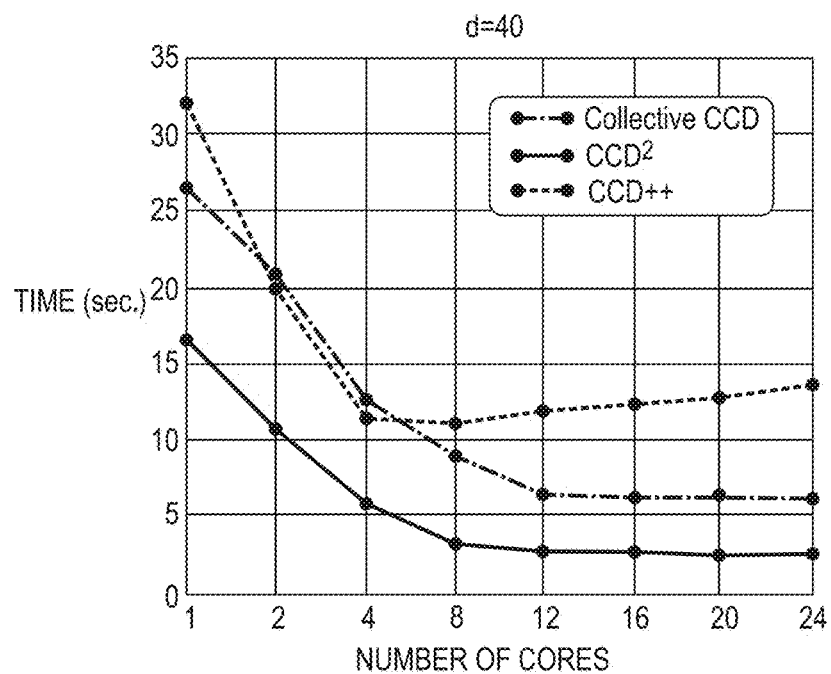

With Reference to FIGS. 9A-C, the run time for both CCD² and CCD++ are plotted as a function of the number of processing cores for the training dataset of Dataset2 and for latent feature spaces of size 10, 20 and 40, respectively. With reference to FIGS. 10A-C, the run time for CCD², Collective CCD² and CCD++ are plotted as a function of the number of processing cores for the training dataset of Dataset1 and for latent feature spaces of size 10, 20 and 40, respectively. The training dataset of Dataset1 is 20% of the samples.

Figure 11A:
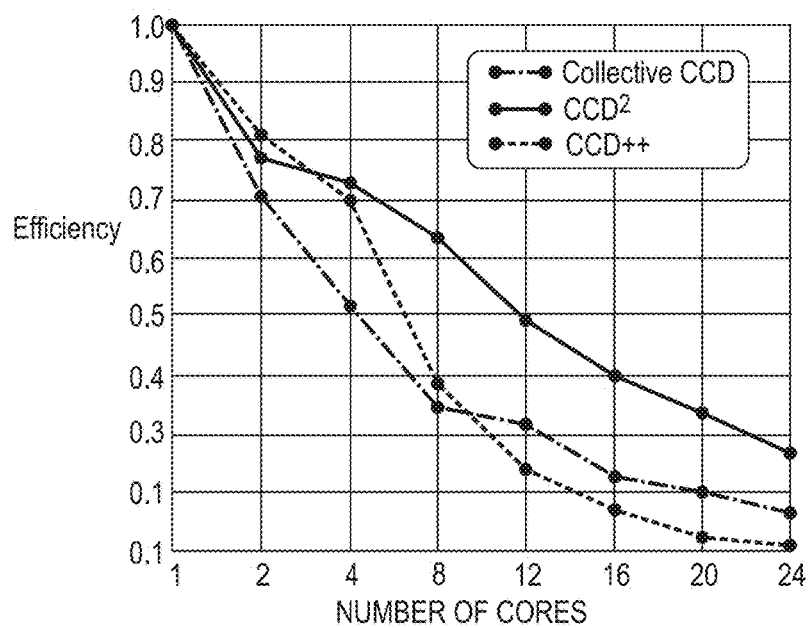
FIGS. 11A & B illustrate plots of the efficiency and speedup, respectively, for $CCD^2$, Collective $CCD^2$ and CCD as a function of the number of processing cores for the training dataset of Dataset1 and for a latent feature space of size 10.
Figure 11B:
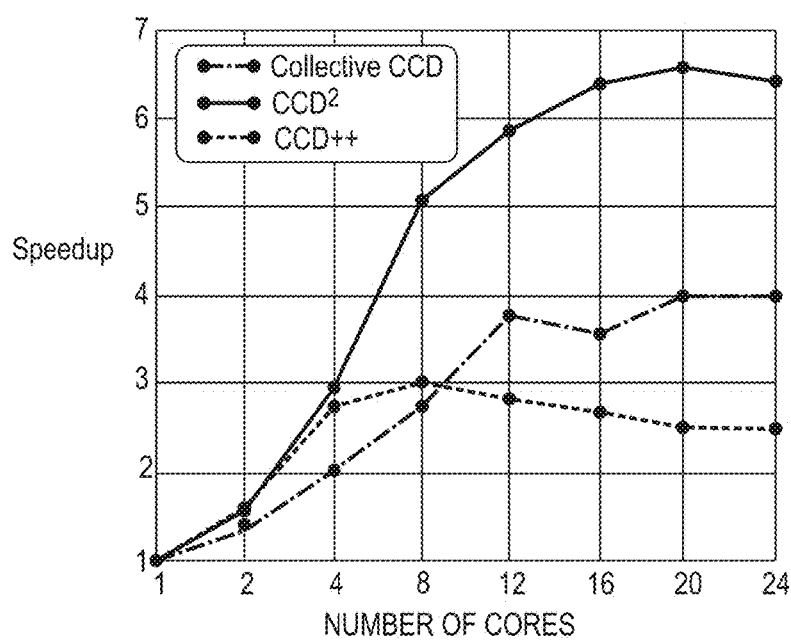

With reference to FIGS. 11A & B, the efficiency and speedup, respectively, for CCD², Collective CCD² and CCD++ are plotted as a function of the number of processing cores for the training dataset of Dataset1 and for a latent feature space of size 10. Speedup is as follows.

$$S_p = \frac{T_1}{T_p} \quad (43)$$

$T_1$ is the start time and $T_p$ is the finish time for p processing cores. Efficiency is as follows.

$$E_p = \frac{T_1}{pT_p} \quad (44)$$

Figure 12A:
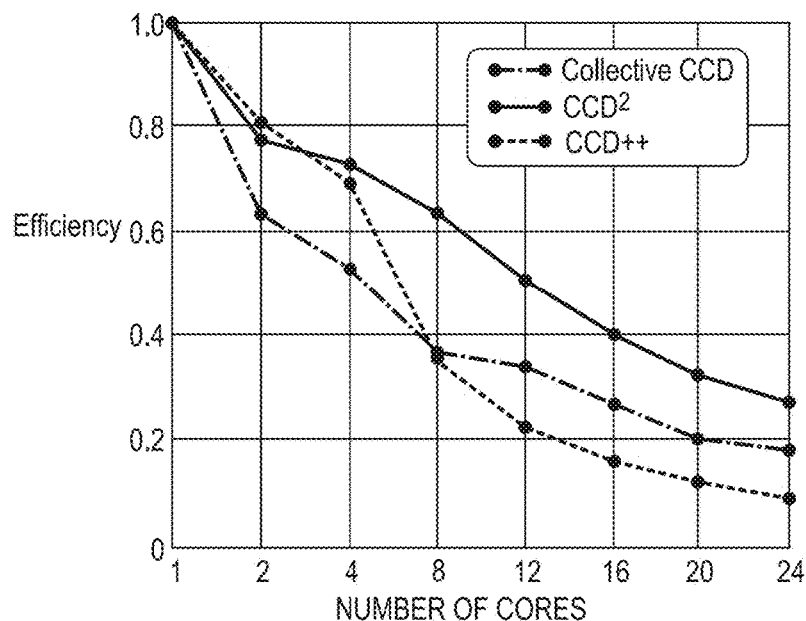
FIGS. 12A & B illustrates plots of the efficiency and speedup, respectively, for $CCD^2$, Collective $CCD^2$ and CCD++ as a function of the number of processing cores for the training dataset of Dataset1 and for a latent feature space of size 40.
Figure 12B:
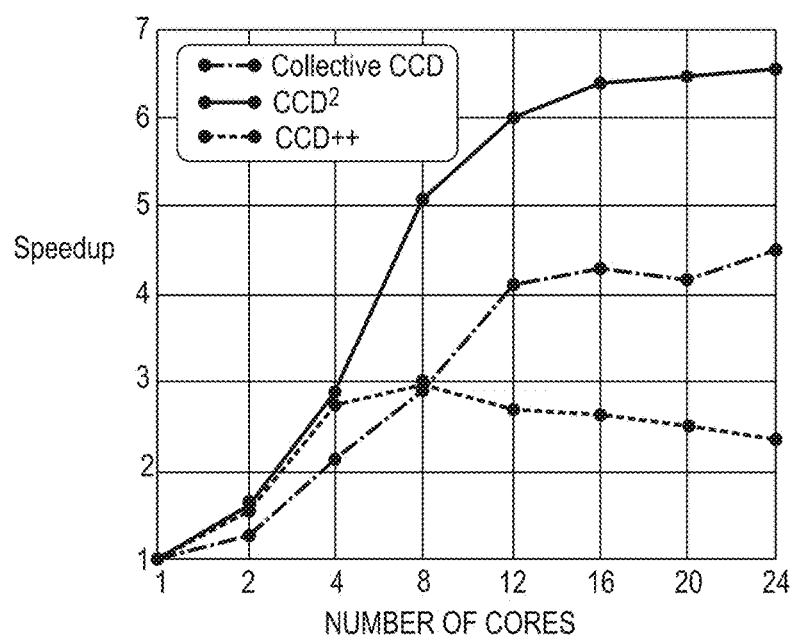

With reference to FIGS. 12A & B, the efficiency and speedup, respectively, for CCD², Collective CCD² and CCD++ are plotted as a function of the number of processing cores for the training dataset of Dataset1 and for a latent feature space of size 40. For FIGS. 11A & B and 12A & B, the training dataset of Dataset1 is 20% of the samples.

As seen in FIGS. 9A-C, 10A-C, 11A & B, and 12A & B, CCD² and Collective CCD² scale better than CCD++. Relative to CCD² and Collective CCD², CCD++ does not scale well for more than 8 processing cores. With more than 8 processing cores, CCD++ actually takes longer than CCD² and Collective CCD². In contrast with CCD++, the runtimes of CCD² and Collective CCD² montonically decrease with additional processing cores. The slowdown of CCD++ is likely due to the time the processing cores are required to wait between parallel sections, which becomes greater as d increases.

5.2 Evaluation Metrics

Two metrics were used to evaluate the effectiveness of CCD² and Collective CCD²: root mean squared error (RMSE); and mean absolute error (MAE). Other metrics that could be used include normalized root-mean-square error (NRMSE), symmetric mean absolute percentage error (SHAPE), etc. The RMSE is used for evaluating the prediction quality of the model against other recommendation systems.

Suppose a stream of incoming updates in which each update includes a user i, a product j, and an actual rating. Given this, the rating is predicted as follows.

$$\hat{r} = U_{i \cdot} V_{j \cdot}^T \quad (45)$$

$U_{i \cdot} \in \mathbb{R}^d$ is the row for user i in the user-by-feature matrix and $V_{j \cdot} \in \mathbb{R}^d$ is the row for product j in the item-by-feature matrix.

The RMSE of a prediction can be calculated as follows.

$$RMSE = \sqrt{\frac{1}{N} \sum_{ij} (r_{ij} - \hat{r}_{ij})^2} \quad (46)$$

N is the number of test instances in the test set, and $r_{ij}$ and $\hat{r}_{ij}$ are the actual and predicted values, respectively. More specifically, $r_{ij}$ may indicate the specific rating user i gave to product j, or simply indicate that user i purchased product j, whereas $\hat{r}_{ij}$ is the value predicted by the model.

The MAE of a prediction can be calculated as follows:

$$MAE = \frac{1}{N} \sum_{ij} |r_{ij} - \hat{r}_{ij}| \quad (47)$$

5.3 Varying Effects of Social Interaction

Collective CCD² allows for additional information to be used in the factorization. During experimental analysis, the α regularization parameter in Collective CCD² and the effects were measured. In the model, the α regularization parameter controls the amount of influence given to the user-by-user matrix (i.e., a matrix describing social interactions between users) in the model. In particular, if α=0 then the social interactions are ignored and only the user-by-item matrix is used in the factorization. Conversely, if α=∞ (or becomes large enough), then only the social interactions are used (as these dominate).

Figures 13A, 13B:
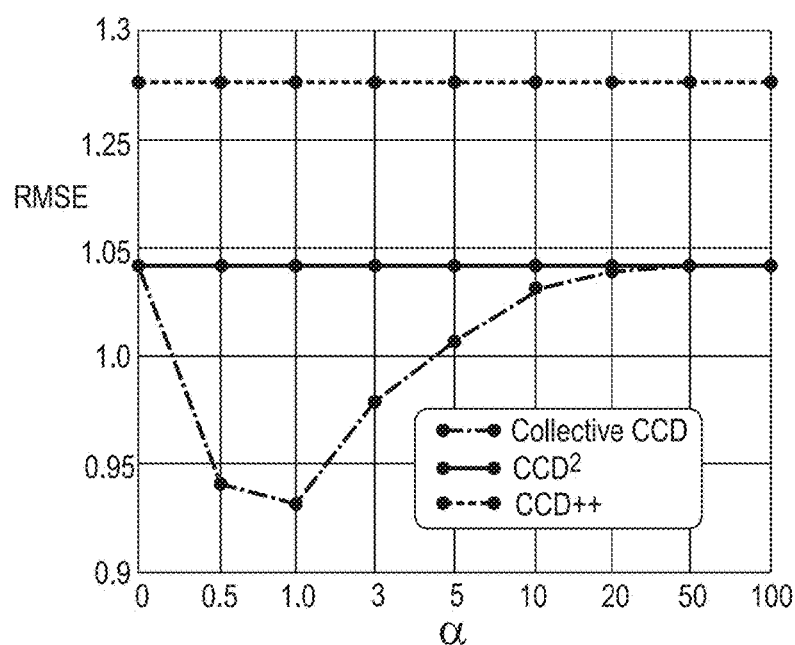
FIG. 13A illustrates a table of Root Mean Squared Error (RMSE) for varying $\alpha$ and varying $\lambda$ values.
FIG. 13B illustrates a plot of RMSE as a function of α for CCD², Collective CCD² and CCD++.
Figure 13C:
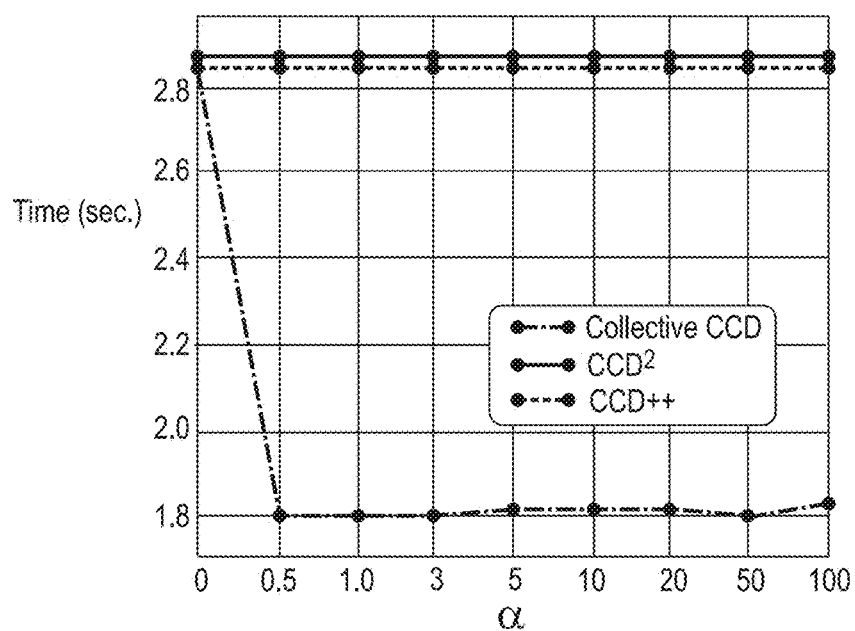
FIG. 13C illustrates a plot of run time as a function of α for CCD², Collective CCD² and CCD++.

With reference to FIGS. 13A-C, the effects of α are illustrated using Dataset1. FIG. 13A illustrates a table of RMSE for varying α and varying λ values. FIGS. 13B & C illustrates RMSE and run time plotted as a function of α for CCD², Collective CCD² and CCD++, where λ=0.1, d=20, and α=1. CCD² and CCD++ are included as baselines. Since Collective CCD² is derived from CCD², α significantly influences performance. This indicates that incorporating information from the user-by-user matrix improves performance over what is obtainable using only the user-by-item matrix. In particular, the prediction accuracy increases as a increases, but then begins to decrease as a becomes larger. Hence, the optimal accuracy is achieved when the user-by-item and user-by-user matrices are used. However, if only one is used, then the performance is worse.

Note that if λ=0 then V becomes useless. Thus, any prediction of the ith user's preferences via $u_i^T V$ becomes impossible, even if the user-by-user matrix is used (since it only influences U directly).

6. System

Figure 14:
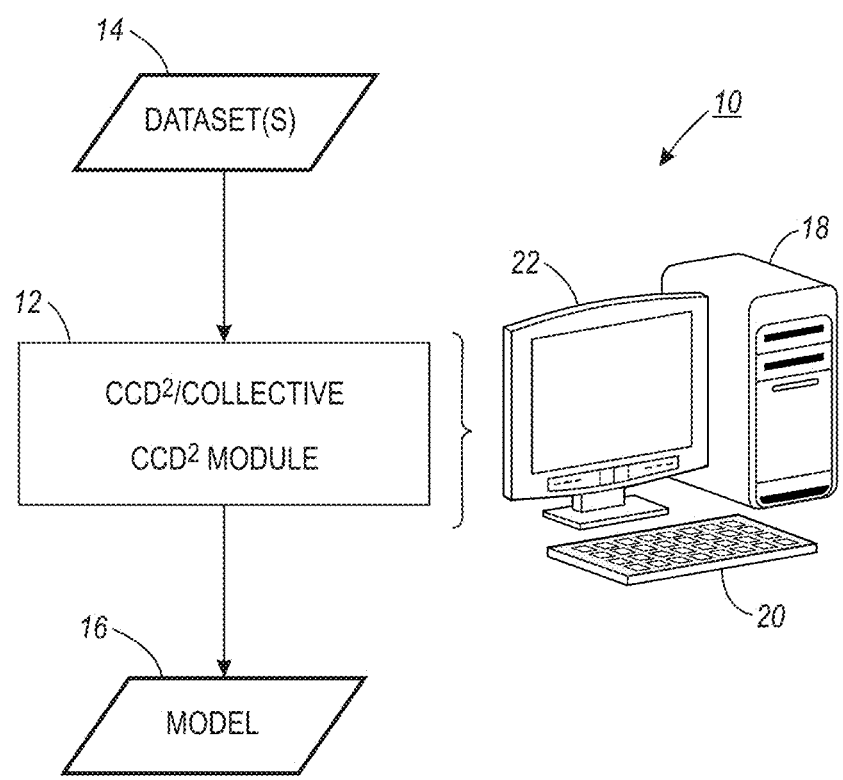
FIG. 14 illustrates a matrix factorization system implementing CCD² and/or Collective CCD².

With reference to FIG. 14, a matrix factorization system 10 includes a CCD²/Collective CCD² module 12 (hereafter referred to as the CCD² module). The CCD² module 12 receives one or more datasets 14 to be fused and factorized together into a model 16. The datasets 14 share at least one dimension (e.g., a user dimension) and are, for example, graphs represented as adjacency matrices or traditional data in the form of rows and columns. The rows are typically user information and the columns are typically features/attributes.

The CCD² module 12 can be hardware, software or a combination of both. Where the CCD² module 12 includes software, the system 10 includes one or more digital processing devices 18, such as computers. Each of the digital processing devices 18 includes or has access to digital storage (e.g., via the Internet or a local area network). Further, each of the digital processing devices 18 includes one or more digital processors, such as a microprocessor (typically having multiple processing cores), a microcontroller, a graphic processing unit (GPU), etc., to execute the software. Typically, the storage stores the software and the digital processors execute the software.

The digital processing devices 18 can execute the software in parallel using both microprocessors and GPUs. Further, the digital processing devices 18 can execute the software in parallel over, for example, a communications network, such as a local area network.

The digital processing devices 18 suitably include or are operatively connected with one or more user input devices 20, such as an illustrated keyboard, for receiving user input to control the CCD² module 12. In other embodiments, the input for controlling the CCD² module 12 is received from another program running prior to or concurrently with the CCD² module 12 on the digital processing devices 18, or from a network connection, or so forth.

Further, the digital processing devices 18 suitably include or are operatively connected with one or more display devices 22, such as an illustrated cathode ray tube (CRT) monitor, for displaying output generated based on the output of the CCD² module 12. In other embodiments, the output may serve as input to another program running subsequent to or concurrently with the CCD² module 12 on the digital processing devices 12, or may be transmitted via a network connection, or so forth.

7. Applications

Matrix factorization according to CCD² and Collective CCD² has a number of applications, including: matrix completion; data mining; data fusion; regression/link strength analysis; link existence prediction; ensemble use/preprocessing; dimensionality/noise reduction; forecasting; feature selection/extraction; graph roles and clustering; and recommendation generation.

Matrix completion allows any missing entry of a matrix $A \in \mathbb{R}^{m \times n}$ to be accurately filled in using U and V since $A \approx UV^T$. Similarly, matrix completion allows any missing entry of a matrix $S \in \mathbb{R}^{m \times m}$ to be filled in using U and Z since $S \approx UZ^T$.

Data mining describes the arbitrary analysis of U, V, and Z to extract useful data. For example, since the d columns of U and V correspond to the main directions (i.e., main latent features), then the rows of these matrices may be ordered to retrieve the top k users and products. As another example, k-means clustering can be applied to find interesting groups or trends.

Data fusion fuses two or more arbitrary matrices, typically sparsely populated matrices, sharing common dimensions using Collective $CCD^2$. For example, consider an online retail dataset stored in a relational database (or any arbitrary data type), and including many columns and rows. If only a user column is considered, this column can be merged with purchases or other parameters to get a matrix for which Collective $CCD^2$ can be applied. This matrix can then be fused with a user-by-user matrix representing a social network.

Regression/link strength analysis describes arbitrary regression analysis. For example, $CCD^2$ or Collective $CCD^2$ can be used for predicting the rating of a movie for a given user, for predicting the number of items a user will purchase, or for predicting the total revenue of a product.

Link existence prediction can be used to predict links between arbitrary people, web pages, products, events, interactions, etc. For example, links for only products that users have not bought can be predicted by filling in all the missing entries for a user i as $U_i *V^T e$, where $e \in \mathbb{R}^n$ is a vector with element $e_j = 1$ if user i did not buy product j. Afterwards, the predicted link strengths can be sorted, and the top-k can be displayed.

Ensemble use/preprocessing applies $CCD^2$ or Collective $CCD^2$ to several different models or an ensemble of models, and then combines the trained models. For example, nearest neighbor techniques can be used on top of U and V. As another example, $CCD^2$ or Collective $CCD^2$ can be used with a variety of other models, such Hypergraph Clustering.

Dimensionality/noise reduction factorizes a matrix A or S, which is typically large, dense and/or noisy, into two smaller matrices U and V, or U and Z, respectively. U, V, and Z may then be used directly as they capture the significant directions of the data, or as an approximation of $A \approx UV^T = A'$ and $S \approx UZ^T = S'$. The new matrices A' and S' are more meaningful since noise has been removed and it only represents the significant features of the data.

Forecasting describes the prediction of the product a user will buy at t+1 by treating a user-by-product matrix as a continuous, dynamic system and using the current data at time t with exponentially weighted past data from t−1. For example, exponential weighting based on time can be applied by replacing A in the foregoing equations with the following.

$$(1-\theta)A_{t-1} + \theta A_t \tag{48}$$

θ is typically 0.7 and represents the weighting factor.

Feature selection/extraction pertains to selecting or extracting features from a large, possibly dense, matrix A. The matrix A can include billions of rows and possibly columns. Feature extraction is performed picking a model size d and then computing U and V, which represent the main latent features of the data. The columns of U and V represent more informative latent features of the users and items, respectively, since $CCD^2$ and Collective $CCD^2$ perform the best rank-d approximation of A where noise and possibly redundant features are removed. Note these features may also be included in various tasks, like classification, clustering, etc.

Graph roles and clustering receives a large, possibly dense, matrix A that is tall and skinny (i.e., the number of columns is insignificant compared to the number of rows) and that represent features of the graph (degree, wedges, cores, egonets, etc.). Roles are then computed by finding the best rank-d approximation of $A \approx A' = UV^T$ where U corresponds to the roles and V represents the influence of the features given to each role.

Recommendation generation generates recommendations of items (e.g., products, businesses, etc.) by learning weights of items for a user based on user preferences in a user-by-item matrix. Social preferences can also be taken into account. These weights can then be binned in linear time by applying a hash function (or vertical binning) and the top-k recommendations can be served to that user.

7.1 Real-Time Recommendations $CCD^2$ and Collective $CCD^2$ can be used in a variety of real-time recommendation systems. For a real-time recommendation system, three types of computations are assumed with various computational limitations: real-time; incremental; and batch.

7.1.1 Real-Time Computations

A real-time computation includes quickly (i.e., within a few milliseconds) computing a recommendation from U and V for a user i, where the user may or may not have purchased anything in the past. The recommendations can be computed as $\hat{r} = U_i \cdot V^T$, where $\hat{r}$ is a vector of weights. The weights can be computed in approximately O(nd) time. Once the weights are computed, the weights are sorted and the top-q are presented to the user.

In some embodiments, the number of products the user i shares with other users can be combined with the prediction given by $CCD^2$ or Collective $CCD^2$. For example, a prediction given by Collective $CCD^2$ can be normalized by combining the weight of the prediction with the number of shared products.

Instead of computing $\hat{r} = U_i \cdot V^T$ using the entire $V^T$, the set of items to compute ratings for can be constrained based on select criteria, such as clusters, neighborhood, friends, similarity, etc. For example, heuristics may be used to only search over q entries, where q is much less than n (e.g., using simple similarity, social network, etc.). As another example, using k-means, the users and products could be clustered into groups. Then, with C(i) being products belonging to the cluster of user 1, the above can be rewritten as follows.

$$\hat{r} = U_i \cdot V_{C(i)}^T \tag{49}$$

$\hat{r}$ is of length |C(i)|.

One approach to approach to constrain the set of items is using common neighbors to select a subset of the n products. This improves the scalability since a score is computed for only a fraction of the total n products for each user. In terms of accuracy, it also may help. Note that in this case, the weights from the common neighbors are not used. Instead, only the prediction given by $CCD^2$ or Collective $CCD^2$ is used.

In some embodiments, the preceding approach is implemented by computing the purchased products of a select user $\mathcal{U}$. Let $N_A(\mathcal{U})$ be the set of products purchased by the user $\mathcal{U}$. Further, the set of unique users who also purchased the products in $N_A(\mathcal{U})$ is computed. Let W be the set of unique users.

With W and $N_A(\mathcal{U})$ computed, the products that the users in W have purchased, but that the user u has not purchased, are computed. This is a set difference between $N_A(\mathcal{U})$ and $N_A(W)$, where $N_A(W)$ is the products purchased by the users in W. The runtime is as follows.

$$O(N_A(\mathcal{U})+|W|+N_A(W)) \tag{50}$$

Another approach to approach to constrain the set of items is using friends to select a subset of the n products. In some embodiments, this is implemented by calculating the friends of a select user $\mathcal{U}$. Let $N_S(\mathcal{U})$ be the set of friends of the user $\mathcal{U}$. With $N_S(\mathcal{U})$ computed, the products purchased by each friend in $N_S(\mathcal{U})$ are computed. Let $N_A(w)$ be the products purchased by the wth friend in $N_S(\mathcal{U})$. The runtime is as follows.

$$O(N_S(\mathcal{U})+\Sigma_{w \in N_S(\mathcal{U})}|N_A(w)|) \tag{51}$$

7.1.2 Incremental Computations

Incremental computations incrementally update U, V, and Z. An incremental update adds new users or new products to U, V, and Z, and/or removes old/stale information from A or Z. The updates can be performed periodically or in response to events, such as the addition of new users or products. The former is typically used to add new users or new products and the latter is typically used to remove old/stale information.

To remove old/stale information, note that each user has a fixed-sized reservoir containing the most recent purchases/rating. Purchases or ratings are removed over time as they become old/stale. Old/stale information is purchase or ratings information older than a predetermined temporal threshold.

To add a new user i who has purchased product j, a vector $a \in \mathbb{R}^n$ of length n is created. The purchased products are marked in the vector with a nonzero value or a rating if available. Next, a is projected into the latent user feature space as follows.

$$\hat{u}_i = a^T V \tag{52}$$

$\hat{u}_i$ can now be inserted into U either at the end by increasing the size (m+1) or at the location of an inactive user.

The foregoing is similarly performed to add a new user i who has friended another user k, or to add a new product j purchased by a user i. To carry out the latter, a vector $b \in \mathbb{R}^m$ of length m is created and projected into the latent product feature space as follows: $\hat{v}_i = b^T U$, where $v_i$ is inserted into V according to one of the foregoing approaches. To carry out the former, a vector $c \in \mathbb{R}^m$ of length m is created and projected into the latent social network feature space as follows: $\hat{z}_i = c^T U$, where $z_i$ is inserted into Z according to one of the foregoing approaches.

After performing an incremental update, a few iterations of $CCD^2$ or Collective $CCD^2$ can be run to get a better approximation. The number of iterations are chosen by the user. The iterations can be performed immediately after adding a new user or product, for example, in response to a new user or product event. Alternatively, the iterations can be performed periodically regardless of when the new user or product is added. The period can also be chosen by the user.

In applying periodic iterations, the system is treated as a dynamic system. The time-scale of the system is denoted $\tau$ and the time-scale of the application is denoted t. Each iteration of the dynamic system corresponds to some time period in the application time. For example, if $\tau=5$ and $t=1$ hour, then a single iteration is performed every 12 minutes.

7.1.3 Batch Computations

Batch computations recompute U, V, and Z from scratch. This includes performing model selection and training the model on A and S periodically and less frequently than done for the incremental computations. For example, every evening at midnight, the batch computations can be performed. The model selection suitably adapts parameters of the model, such as model size d and/or regularization parameters $\alpha$ and $\lambda$. Advantageously, by recomputing U, V, and Z from scratch, new users, updates/new purchases, new friendships, etc. are incorporated into the model.

7.1.4 Implementation

Figure 15:
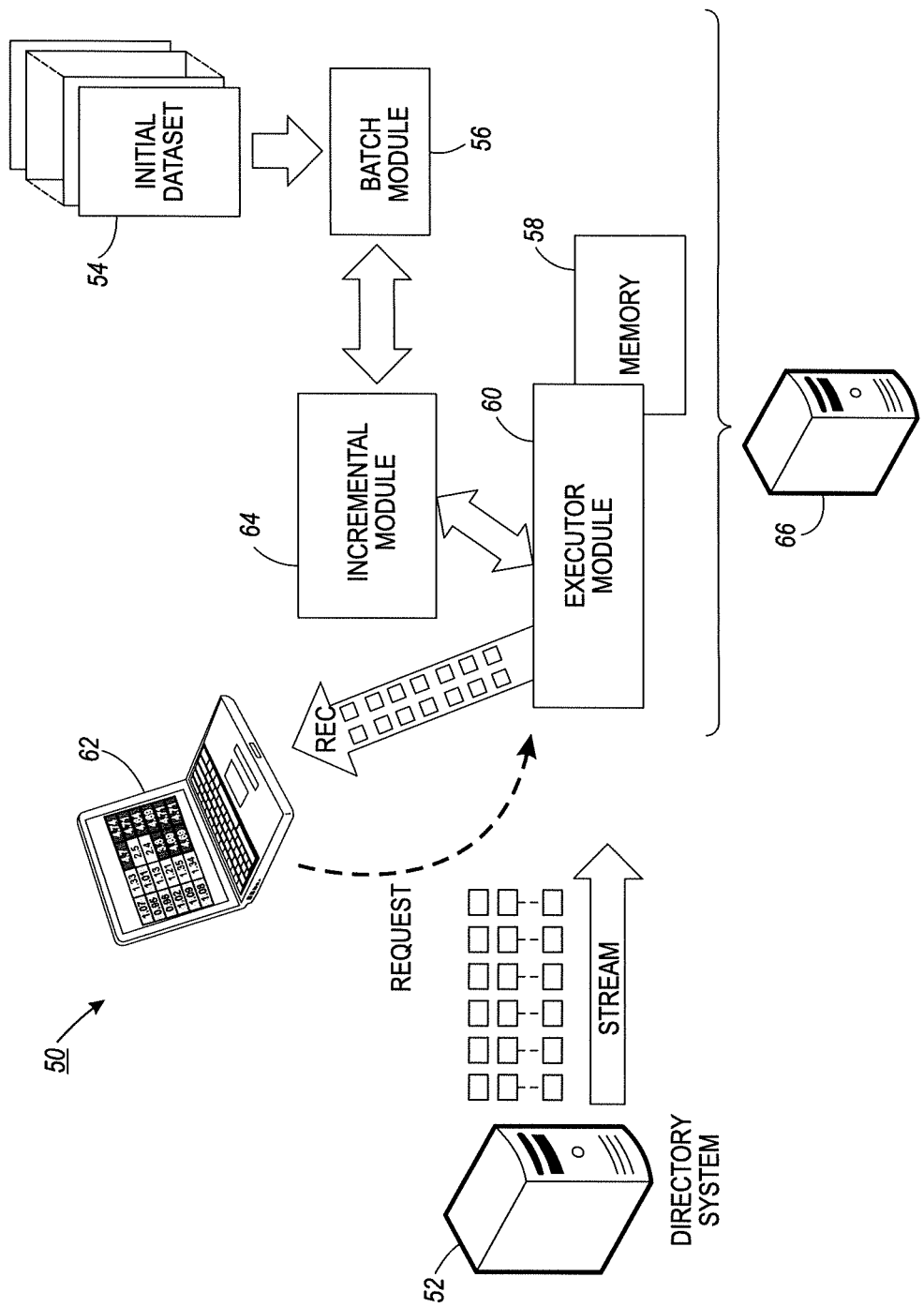
FIG. 15 illustrates a real-time recommendation system using CCD² and/or Collective CCD².

With reference to FIG. 15, a real-time recommendation system 50 is provided. The recommendation system 50 is typically employed in conjunction with a directory system 52, such as an electronic commerce system, a movie rental system, a music streaming system, or the like, generating one or more datasets to be factorized for recommendations.

Initially, the recommendation system 50 receives one or more initial datasets 54 from which to base the recommendations. This initial datasets 54 are typically received from the directory system 52. The initial datasets 54 include a user-by-item matrix, and optionally a user-by-user matrix (e.g., a social network). The item can be, for example, a product, a movie, a business, or any other item known to be recommended to users.

The initial datasets 54 are used to select and train a model, as described above, approximating the initial datasets 54. The initially selection and training can be performed upon receipt of the initial datasets or by a batch computation module 56 periodically performing batch computations. To select and train the model, the recommendation system 50 makes use of, or includes, the matrix factorization system 10 of FIG. 14. The lower dimensional matrices approximating the initial datasets 54 are suitably stored in one or more memories 58 of the recommendation system 50.

After the initial training, the recommendation system 50 can be employed to provide users of the directory system 52 with recommendations from the lower-dimensional matrices. In that regard, an executor module 60 of the recommendation system 50 performs real-time computations to provide users with recommendations on request and within a few milliseconds. The requests are received from users (e.g., browsing a directory of the directory system 52) by way of user computing devices 62. The recommendations are returned to the user by way of the user computing devices 62.

At periodic intervals (e.g., at midnight or every few days), the batch computation module 56 performs batch computations. In that regard, the batch computation module 56 coordinates with the matrix factorization system 10 of FIG. 14 to select and train the model on current datasets. The current datasets are initially the initial datasets 54 and updated over time with a stream of updates to the initial dataset 54 from the directory system 52. These updates can include, for example, the addition of new users and/or items. The current datasets can also be maintained in the memories 58 of the recommendation system 50. In some embodiments, model selection is performed based on stream characteristics.

Upon receipt of new users or items from the stream, or at periodic intervals, an incremental computation module 64 performs incremental computations to remove old/stale data is removed from the current datasets. Additionally, or alternatively, the incremental computation module 64 performs incremental computations to project the new users or items into the lower-dimensional matrices. After performing an incremental update to the current datasets, or projecting into the lower-dimensional matrices, the matrix factorization system 10 of FIG. 14 performs a predetermined number of iterations to refine the lower dimensional matrices. The period with which incremental computations are performed is less than the period for batch computations.

The incremental computation, executor and batch computation modules 56, 60, 64 can each be one of hardware, software, or a combination of both. Where these modules 56, 60, 64 include software, the software is executed by one or more digital processing devices 66, such as the digital processing devices 18 of FIG. 14. Where the recommendation system 50 includes multiple digital processing devices, the execution of the software can be distributed across the digital processing devices and performed in parallel.

As seen above, the recommendation system 50 dynamically adapts to the changing characteristics of the stream. This includes adapting the model parameters based on the stream. For example, the model size d and/or the regularization parameters λ and α can be dynamically adapted in real-time. This is advantageous for data that is bursty or has various other temporal properties (e.g., cycles, spikes, etc.).

8. Summary

The framework can be used to build many commercial applications and tools. As described herein, the framework is applied to recommendation, but it also has other use cases, such as predicting correlations among objects or predicting links between people. In addition, the framework may be viewed as a system for compression, since large matrices may be factorized into much smaller matrices that approximate the original large matrix. It has many other applications as well.

While $CCD^2$ or Collective $CCD^2$ were described for a user-by-item matrix and a user-by-user matrix, those skilled in the art will appreciate that other matrices can be employed. The matrices need only share a common dimension (e.g., users). Further, while Collective $CCD^2$ was described for fusing and factorizing only two matrices, those skilled in the art will appreciate that Collective $CCD^2$ can be extended to fusing and factorizing more than two matrices.

Advantageously, the framework is flexible, scalable in streaming environments, efficient/fast, and accurate. The framework can fuse an arbitrary number of edge attributes (matrices) or vertex attributes (vectors), and the computational complexity of the framework is linear in the number of nonzeros in the matrices. Further, the framework is incremental and scalable for the streaming environment. Moreover, the framework is efficient/fast for "big data" with billions or more edges.

The framework is also accurate and solves data sparsity issues (e.g., users with few or no item/purchase history). More specifically, the framework improves accuracy and performance relative to known CCD based approaches to matrix factorization, such as CCD++. This is achieved by using improved parallel constructs, which allow threads to perform more work while waiting less, and by using additional data sources. For example, a social network can be used for product recommendations, which improves accuracy of recommendations since users are more likely to have similar preferences with friends than arbitrary people.

The above-described subject matter has a variety of applications and advantages, including but not limited to the following.

Providing a general parallel matrix factorization framework suitable for factorizing many types of datasets such as graphs (represented as adjacency matrices) or traditional data in the form of rows and columns where the rows may be user information and the columns might be features/attributes, among many other datasets;

Providing a factorization approach ($CCD^2$++) based on cyclic coordinate descent, which is shown to be faster and more accurate than recent methods.

Providing a general parallel framework for factorizing arbitrary number of matrices and attributes called Collective $CCD^2$++, which fuses multiple data sources (edge attributes=matrices, vertex attributes=vectors) into a single matrix factorization that is fast for big data and general enough for a wide range of applications.

Providing a method for improving the prediction/accuracy problems with sparse data/graphs. These problems arise when rows or columns of the matrix or data have only a few number of nonzero values. This makes it almost impossible to obtain good predictions. The method proposed herein, utilizes additional matrices, and combines this information in order to improve predictions.

Providing a method for solving the data sparsity problem by leveraging additional information in the factorization of a matrix or multiple matrices.

Providing a real-time matrix factorization system that is fast, scalable, and accurate and that is applicable for a variety of applications such as recommendation.

Providing a lock-free method for factorizing matrices which also is wait-free between updating U, V, or other matrices, meaning that the workers (i.e., threads, processing units) that perform parallel updates to U, do not have to wait until all workers are finished, before starting to update V, or any other matrix. If a worker finishes before the others, then it moves immediately to updating the other matrices, without the need to wait until all workers finish updating U before starting on updating V.

Providing a parallel method for factorizing big data and fast with a runtime of $O(|E(G)|+|E(S)|)$ where G and S are graphs, thus linear in the number of edges in the graphs.

Providing a method for reducing the dimensionality or compressing a dataset (e.g., a graph) that is flexible in the sense that the number of dimensions k may be specified by the user, hence, if space and speed is of importance, then a small k may be selected, while if accuracy is more important than space and speed, then the user may specify a larger k.

Providing a method for learning a model for prediction of user preferences (i.e., items such as those found in a retail store). The system learns a much smaller, more compact representation of the original dataset, which can then be used for a variety of applications. This has the benefit of only requiring the much smaller model to be loaded into memory, and does not require the original data, etc. . . .

Providing a method for adjusting the matrix factorization and the resulting model using either user-defined parameters given as input, or learned automatically through cross-validation.

Providing a system for evaluating and tuning a model for a particular prediction or factorization task. The system may be configured with a wide variety of error measures such as root mean square error (RMSE), normalized root mean square error (NRMSE), mean absolute error (MAE), and symmetric mean absolute percentage error (SMAPE), among others.

Providing a method for performing updates to a matrix in-place, which avoids the need to copy the updated vectors back into the original matrix. Saving both the time required to do so and the space required to store the intermediate results.

Providing a method for computing the top-k predictions in an online streaming manner, which requires storing only k values. The method has constant O(1) for checking if a prediction is in the top-k and an insertion time O(k) in the worst-case.

Providing a method for processing recommendations (and other applications) in a streaming real-time setting. The method is completely parallel able to handle bursts in streams where many users would make requests simultaneously. In this case, the method would simply divide such requests among the p processing units, and use the smaller model learned from the matrix factorization framework to obtain predictions independently of one another.

Providing a system for real-time recommendations consisting of three main computations: batch, incremental, and real-time.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for matrix factorization, said system comprising:
at least one processor programmed to:
receive at least one matrix to be factorized into a plurality of lower-dimension matrices defining a latent feature model;
set at least some of the entries in the plurality of lower-dimension matrices to zero in order to apply sparsification to the plurality of lower dimension matrices; and
update the latent feature model to approximate the at least one matrix, the latent feature model including a plurality of latent features, and the update performed by:
cycling through the plurality of latent features at least once; and
alternatingly updating the plurality of lower-dimension matrices during each cycle;
wherein the update includes:
partitioning first and second matrices of the plurality of lower-dimension matrices into blocks;
dynamically assigning the blocks to a plurality of workers to alternatingly update the plurality of lower-dimension matrices during each cycle, wherein the assigning includes:
assigning the blocks of the first matrix to the plurality of workers as the plurality of workers become free to update the first matrix in parallel; and
once all of the blocks of the first matrix are assigned, and regardless of whether a worker of the plurality of workers is processing a block of the first matrix, assigning the blocks of the second matrix to the plurality of workers as the plurality of workers become free to update the second matrix in parallel;
wherein:
the at least one processor is further programmed to end the update when a current inner-iteration reduces a localized objective function to less than a specified value;
the update is performed based on cyclic coordinate descent (CCD);

the at least one matrix includes a plurality of matrices, and wherein the at least one processor is further programmed to fuse and factorize the plurality of matrices by the update;
the plurality of matrices include a user-by-item matrix and a user-by-user matrix, the user-by-item matrix describing user interactions with items, and the user-by-user matrix describing user interactions with other users; and
the at least one processor is further programmed to generate recommendations from the plurality of lower-dimension matrices without use of the at least one matrix.

2. The system according to claim 1, wherein the at least one matrix represents a graph or a dataset of rows and columns.

3. The system according to claim 1, wherein the at least one processor is further programmed to:
automatically optimize parameters of the latent feature model based on the at least one matrix before the update to minimize an objective function.

4. The system according to claim 1, wherein the plurality of lower-dimension matrices are alternatingly updated in place during each cycle.

5. The system according to claim 1, wherein the at least one processor is further programmed to:
receive a stream of updates to the at least one matrix in real time; update the at least one matrix with the updates of the stream;
project a new column or row of the at least one matrix into a latent feature space of the latent feature model, the column or row newly added to the at least one matrix by the updates; and
add the projection to the plurality of lower-dimension matrices.

6. A method for matrix factorization, said method comprising:
receiving, by at least one processor, at least one matrix to be factorized into a plurality of lower-dimension matrices defining a latent feature model;
setting at least some of the entries in the plurality of lower-dimension matrices to zero in order to apply sparsification to the plurality of lower dimension matrices; and
updating, by the at least one processor, the latent feature model to approximate the at least one matrix, the latent feature model including a plurality of latent features, and the updating performed by:
cycling through the plurality of latent features at least once;
and
alternatingly updating the plurality of lower-dimension matrices during each cycle;
wherein the updating further includes:
partitioning first and second matrices of the plurality of lower-dimension matrices into blocks;
dynamically assigning the blocks to a plurality of workers of the at least one processor to alternatingly update the plurality of lower-dimension matrices during each cycle, wherein the assigning includes:
assigning the blocks of the first matrix to the plurality of workers as the plurality of workers become free to update the first matrix in parallel; and
updating the second matrix in parallel by: once all of the blocks of the first matrix are assigned, and regardless of whether a worker of the plurality of workers is processing a block of the first matrix, assigning the blocks of the second matrix to the plurality of workers as the plurality of workers become free;

wherein:
the updating is ended when a current inner-iteration reduces a localized objective function to less than a specified value;
the updating is performed based on cyclic coordinate descent (CCD);
the at least one matrix includes a plurality of matrices, and wherein the method further includes fusing and factorizing the plurality of matrices by the updating;
the plurality of matrices include a user-by-item matrix and a user-by-user matrix, the user-by-item matrix describing user interactions with items, and the user-by-user matrix describing user interactions with other users; and
the method further includes generating recommendations from the plurality of lower-dimension matrices without use of the at least one matrix.

7. The method according to claim 6, further including:
automatically optimizing parameters of the latent feature model based on the at least one matrix before the updating to minimize an objective function.

8. The method according to claim 6, wherein the plurality of lower-dimension matrices are alternatingly updated in place during each cycle.

9. The method according to claim 6, further including:
receiving a stream of updates to the at least one matrix in real time;
updating the at least one matrix with the updates of the stream;
projecting a new column or row of the at least one matrix into a latent feature space of the latent feature model, the column or row newly added to the at least one matrix by the updates; and
adding the projection to the plurality of lower-dimension matrices.

10. The system according to claim 1, wherein the specified value is $E\Delta_{max}$, where E is a positive ratio, and $\Delta_{max}$ is a maximum function reduction for past inner iterations of a current outer iteration.

11. The method according to claim 6, wherein the specified value is $E\Delta_{max}$, where E is a positive ratio, and $\Delta_{max}$ is a maximum function reduction for past inner iterations of a current outer iteration.

12. A system for matrix factorization, said system comprising:
at least one processor programmed to:
randomly initialize each of a user feature matrix, an item feature matrix and a social network feature matrix;
set at least some of the entries in each of the user feature matrix, the item feature matrix and the social network feature matrix to zero in order to apply sparsification to each of the user feature matrix, the item feature matrix and the social network feature matrix;
alternatingly update, using column-wise updates, each of the user feature matrix, the item feature matrix and the social network feature matrix, the update including:
partitioning each of the user feature matrix, the item feature matrix and the social network feature matrix into blocks;
dynamically assigning the blocks to a plurality of workers to alternatingly update the user feature matrix, the item feature matrix and the social network feature matrix during each cycle, wherein the assigning includes:
assigning the blocks of a first matrix of the user feature matrix, the item feature matrix and the social network feature matrix to the plurality of workers as the plurality of workers become free to update the first matrix in parallel; and
once all of the blocks of the first matrix are assigned, and regardless of whether a worker of the plurality of workers is processing a block of the first matrix, assigning the blocks of a second matrix of the user feature matrix, the item feature matrix and the social network feature matrix to the plurality of workers as the plurality of workers become free to update the second matrix in parallel.

* * * * *